US012736976B2

(12) United States Patent
Parker et al.

(10) Patent No.: US 12,736,976 B2
(45) Date of Patent: Sep. 15, 2026

(54) SYSTEMS AND ASSOCIATED METHODS FOR MERGING SENSOR DATA

(71) Applicant: BrightAI Corporation, San Francsico, CA (US)

(72) Inventors: Robert Parker, Hillsborough, CA (US); Haidong Wang, Clyde Hill, WA (US); Albert Stephen Carr, III, Merritt Island, FL (US); Ryan James Goss, Prior Lake, MN (US)

(73) Assignee: BrightAI Corporation, Palo Alto, CA (US)

( * ) Notice: Subject to any disclaimer, the term of this patent is extended or adjusted under 35 U.S.C. 154(b) by 0 days.

(21) Appl. No.: 18/492,699

(22) Filed: Oct. 23, 2023

(65) Prior Publication Data

US 2025/0130575 A1 Apr. 24, 2025

(51) Int. Cl.
*G05D 1/246* (2024.01)
*G05D 105/45* (2024.01)
*G05D 105/80* (2024.01)
*G05D 111/10* (2024.01)

(52) U.S. Cl.
CPC ......... *G05D 1/246* (2024.01); *G05D 2105/47* (2024.01); *G05D 2105/89* (2024.01); *G05D 2111/17* (2024.01)

(58) Field of Classification Search
None
See application file for complete search history.

(56) References Cited

U.S. PATENT DOCUMENTS 11,348,269 B1 * 5/2022 Ebrahimi Afrouzi ... G01S 17/48
2015/0273776 A1 * 10/2015 Heuser .................. F16L 41/021 156/215
2024/0375223 A1 * 11/2024 Banks ................... G06T 7/0004

* cited by examiner

*Primary Examiner* — James J Lee
*Assistant Examiner* — Elizabeth Galyn Martinez
(74) *Attorney, Agent, or Firm* — Shumaker & Sieffert, P.A.

(57) ABSTRACT

Robotic systems and associated methods are described herein. The robotic system may collect measurements from various sensors corresponding to motion of the robotic system, the surrounding environment of the robotic system, or both. The robotic system may generate measurement data based on the collected measurements. Measurements from a particular sensor may be processed in conjunction with different sensors of the robotic system, which may facilitate more accurate or more useful measurement data. The systems and methods of the present disclosure enable the detection, labeling, and locating of features in real time or near real time using the robotic system with little or no reliance on human interaction to detect and map the features. The disclosure provides enhanced accuracy and efficiency as it enhances the functionality and reduces the reliance on human detection of features.

18 Claims, 26 Drawing Sheets

SYSTEMS AND ASSOCIATED METHODS FOR MERGING SENSOR DATA

TECHNICAL FIELD

This disclosure is directed to systems and methods for a robot that automatically detects features and defects in an enclosed space such as an underground pipeline.

BACKGROUND

During pipeline examination, precise identification of all pipeline characteristics and flaws is crucial. Conventional techniques depend on human intervention for detecting features and defects, leading to a process that is susceptible to errors and lacks efficiency. An automated detection method with a high degree of accuracy is essential to address this need.

Some existing mapping systems utilize a visual camera which rely on manual observation to detect features within the scanned environment. Other systems utilize infrared cameras to detect temperature variations within the scanned environment. However, there are no systems that are able to correlate this disjointed set of data.

The concepts relating to pipeline examination are applicable across multiple industries and domains. For example, pipeline examination is critical for water, sewer, gas, and oil pipelines. Likewise, examinations to detect features and defects in, or simply to map, other enclosed spaces, including sites that may contain hazardous chemicals or are not of sufficient size to allow human inspection, also would use the same or similar concepts. As such, an automated detection method with a high degree of accuracy that can be adopted across multiple domains in a plurality of industries is needed to address the need for accurate inspections.

SUMMARY

The present disclosure is directed to a method for detecting features in an environment, including, receiving, by a processor, a collection of sensor data from a plurality of sensors deployed on a robot traversing an environment, each of the plurality of sensors associated with a sensor type, tracking, by the processor, a position of the robot within the environment, wherein the tracking is performed using data received from a position sensor associated with the robot, recognizing, by the processor, each feature associated the sensor type within the environment, using deep learning algorithms operating on the collection of sensor data from the sensor type, mapping the features to the position of the robot, creating three dimensional representations for the recognized features, aggregating the recognized features using a weighting algorithm; and creating an output predicting the features present in the environment.

In an aspect, multiple sensors may be used. For example, the sensors may include one or more IMU sensors, one or more spatial distance sensors such as LIDAR, one or more visual RGB cameras, one or more IR cameras, one or more motor encoders, and one or more application specific sensors. Such application specific sensors may include odor and gas sensors, pressure sensors such as a manometer, air pressure sensors such as a barometer, moisture sensors to detect leaks and liquid infiltration, and ultrasound sensors.

In an aspect, the position of the robot within the environment may be determined in real time based on the use of the one or more sensors. The IMU may include accelerators and gyroscopes. There may be wheel sensors and wheel encoders to track rotations calculated into positional movements. There may be GPS positioning based on the application.

In an aspect, the multimodal scan may result in a digital twin of a pipe or other environment.

In an aspect, the multimodal scan may include real time operator feedback for labeling and or training an artificial intelligence model. The AI algorithm and the operator feedback may form a loop for additional refinement of the inputs and outputs associated with each of the AI model and the operator inputs.

The present disclosure is also directed to three-dimensional sensing and imaging, which includes a method including receiving, by a processor, a collection of individual sensor data from a first sensor deployed on a robot traversing an environment, wherein the individual sensor data comprises two-dimensional sensor data relating to the environment, tracking, by the processor, a distance moved by the robot within the environment, wherein the tracking is performed using data received from a second sensor associated with the robot, mapping each of the collection of individual sensor data to a position based on the tracking step, and generating, by the processor, a three-dimensional image of the environment based on the mapping step.

In an aspect, the three-dimensional sensing and imaging may utilize simultaneous localization and mapping (SLAM) processes. The robot's distance and position may be tracked and calculated using one or more of an IMU including an accelerometer and/or gyroscopes, wheel sensors and encoders, RGB and visual cameras, spatial distance sensors including LIDAR, and other sensors.

In an aspect, trained artificial intelligence models may be used, including models for image processing, object detection, feature extraction and segmentation. Odometry estimation techniques may be deployed with respect to the position of the robot. Probabilistic modeling and optimization techniques may be employed.

The present disclosure is also directed to the matching of sensor data from a visual camera with sensor data from an infrared camera. In an aspect, a method includes Creating an infrared image from an infrared camera sensor, wherein the infrared image is created by calibrating a temperature image for an area of the infrared image using a gradient-based algorithm, wherein the gradient-based algorithms assigns a color based on specific temperature range of the area, creating a visual image from a visual camera feed, wherein the visual camera feed includes a visual representation of the area, computing a transformation between the temperature image and the visual representation to create a common overlay the area, overlaying the temperature image of the area and the visual representation of the area to create a combined image, and adjusting the overlayed images based on a common frame of reference. In an aspect, the overlaying step includes adjusting the relative mapping to correct for differences in perspectives between the infrared and visual cameras.

The creating an infrared image may include enhancing the contrast of the infrared image, performing noise reduction with respect to the infrared image, enhancing the infrared image using histogram equalization and/or dynamic range compression/

The creating the visual image may include enhancing the contrast of the visual image, performing noise reduction with respect to the visual image, enhancing the visual image using histogram equalization and/or dynamic range compression.

The calibration step may include color/grayscale mapping. There may also be specific application processing.

There may also be user preference associated with a visual display. Additional processing may include determining regions of interest, zooming, and panning. Image analysis tools such as object detection, segmentation and tracking algorithms may also be used.

The present disclosure is also directed to a method including measuring, by one or more sensors of a robotic system, a set of data corresponding to movement of at least a portion of the robotic system, determining, by the robotic system, a position or orientation change of the at least a portion of the robotic system from the set of data, and generating, by the robotic system, frame of reference data for the at least a portion of the robotic system according to the position or orientation change.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

System Overview. This disclosure is directed to systems and methods for mapping features of a three-dimensional environment using robotics and artificial intelligence, with applications including but not limited to the mapping of enclosed or remote spaces, toxic areas, water and gas infrastructure, and other applications. The disclosure includes the combination of multiple sensors, including but not limited to cameras, infrared recognizers (IR), Light Detection and Ranging (LIDAR), motion and other sensors integrated onto robotics system, and fusing the data from those sensors to create a coherent representation of the three-dimensional ("3D") environment. Artificial intelligence ("AI") models are trained using heuristics and statistical data analysis to predict and mark the locations of features. The systems and methods of the present disclosure enable the detection, labeling, and locating features in real time or near real time using the robotic system with little or no reliance on human interaction to detect and map the features. The disclosure provides enhanced accuracy and efficiency as it enhances the functionality and reduces the reliance on human detection of features.

The system comprises hardware and software. While the description herein will describe exemplary hardware functionality and software functionality, it will be understood that certain hardware functions may be provided in software and certain software functions may be implemented in hardware. It will also be understood that while certain functionality will be described as discrete components of an overall system, the scope of the present disclosure includes certain discrete components that may be integrally connected to other components.

The hardware components include a plurality of sensors. Included may be visual and infrared cameras, spatial distance sensors, which may, for example, be LIDAR components, ultrasonic, stereoscopic vision, or other methods to create a point cloud. Additionally, an inertial measurement unit (IMU) or other suitable sensing devices capable of capturing environmental data and motion data. Infrared cameras, RGB cameras, motors and encoders may also be utilized. Such sensors provide measurements such as distances, angles, point-clouds, images, and features to facilitate the robot's spatial awareness and facilitate detection.

The software components include various algorithms and computational techniques for processing the sensor data and extracting meaningful information as set forth in more detail herein. These algorithms employ advanced techniques such as object detection, feature extraction, data association, odometry estimation, probabilistic modeling, and optimization methods.

The present disclosure advances the state of the technological arts by reducing the time required by automatic detection of the features of the environment and improving the accuracy of the mapping and detection by eliminating the potential for human error.

Figure 1:
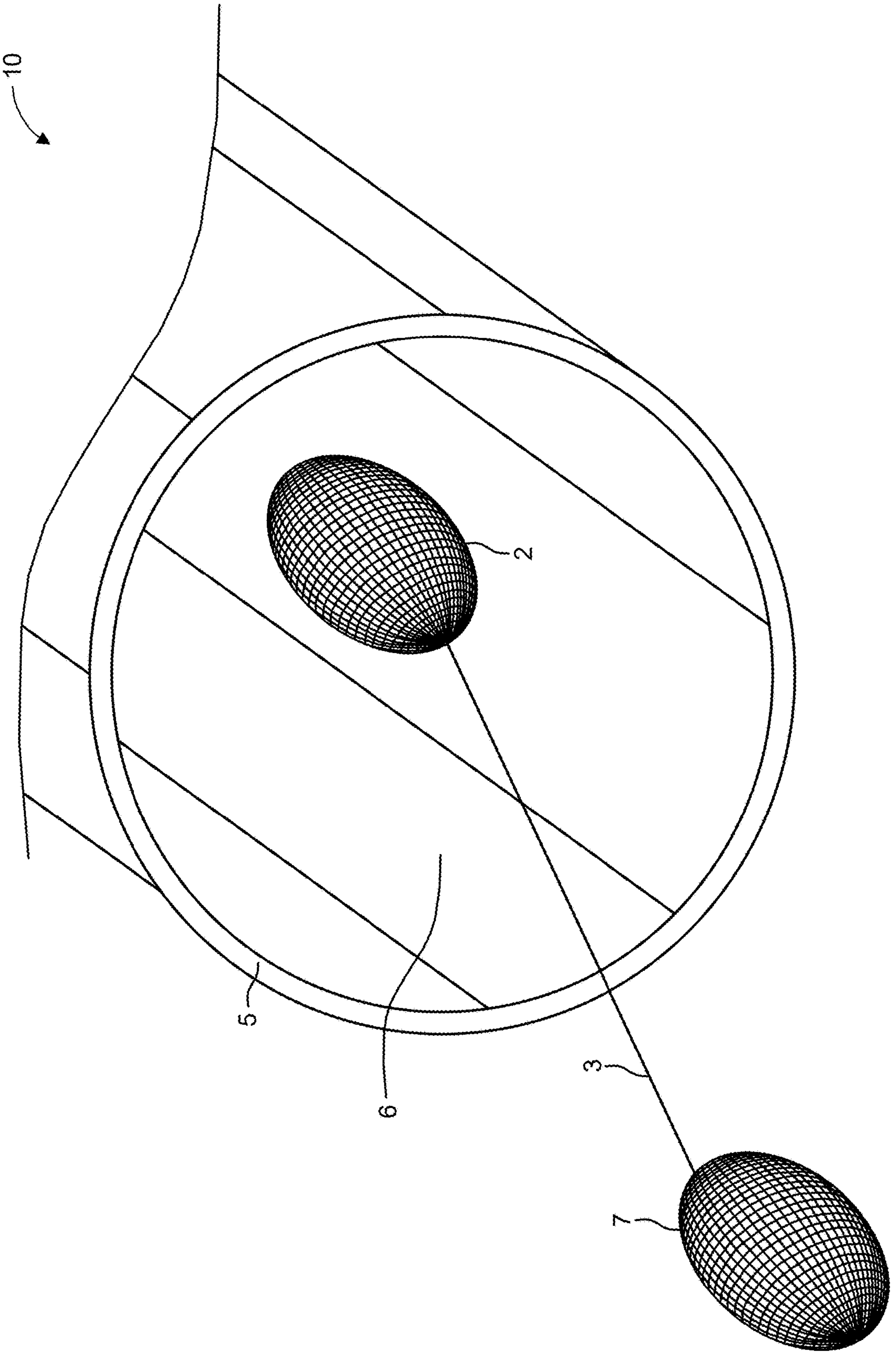
FIG. 1 is an exemplary illustration of one operating environment for the system and method of the present disclosure.

Operating Environment. FIG. 1 is an exemplary view of one of several different operating environments of the present disclosure. In this non-limiting example, the operating environment 10 is an enclosed pipe 5 having interior 6. A robot 2 attached to a tether 3 is disposed within the interior 6. As discussed in greater detail below, robot 2 includes multiple sensors whose data sets are fused together. Through a series of iterative processes, the robotic system 10 combines one or more sensor measurements and estimates the presence of and position/orientation of the features within the scanning environment and records data that is processed with on-board processors to map the interior condition of the pipe 5 in real time, or near real time, and to then convey those conditions to a truck 7 connected to the other end of a tether 3. For example, the robot 2 and the truck 7 may communicate across the tether 3 using Ethernet protocol. The truck 7 may be connected to a server (not shown) or a cloud computing platform for further computing and/or storage.

The tether 3 may span the length of the environment with additional length to traverse from side to side. In an aspect, the environment may be a fifty-foot pipe and the tether may be 100 feet long. While the implementation will be described with respect to tether 3, it will be understood that the on-board processors may communicate with an outside processor via near field communications such as wi-fi, Bluetooth®, or other types of wireless communications, including local area networks and/or wide area networks.

In an embodiment, the robot 2 may have multiple sensors, including, but not limited to, RGB color sensors, infrared sensors, LIDAR sensors, motion sensors, and other sensors. For example, there may be one or more visual cameras to collect still or motion video data, one or more infrared cameras to collection infrared data, one or more inertial measurement unit ("IMU") sensors to collect pose and position data, one or more motor encoders for sensing and collecting position data, one or more LIDAR sensors or cameras for generating 3D point cloud data, and other motion and/or application specific sensors.

Figure 2A:
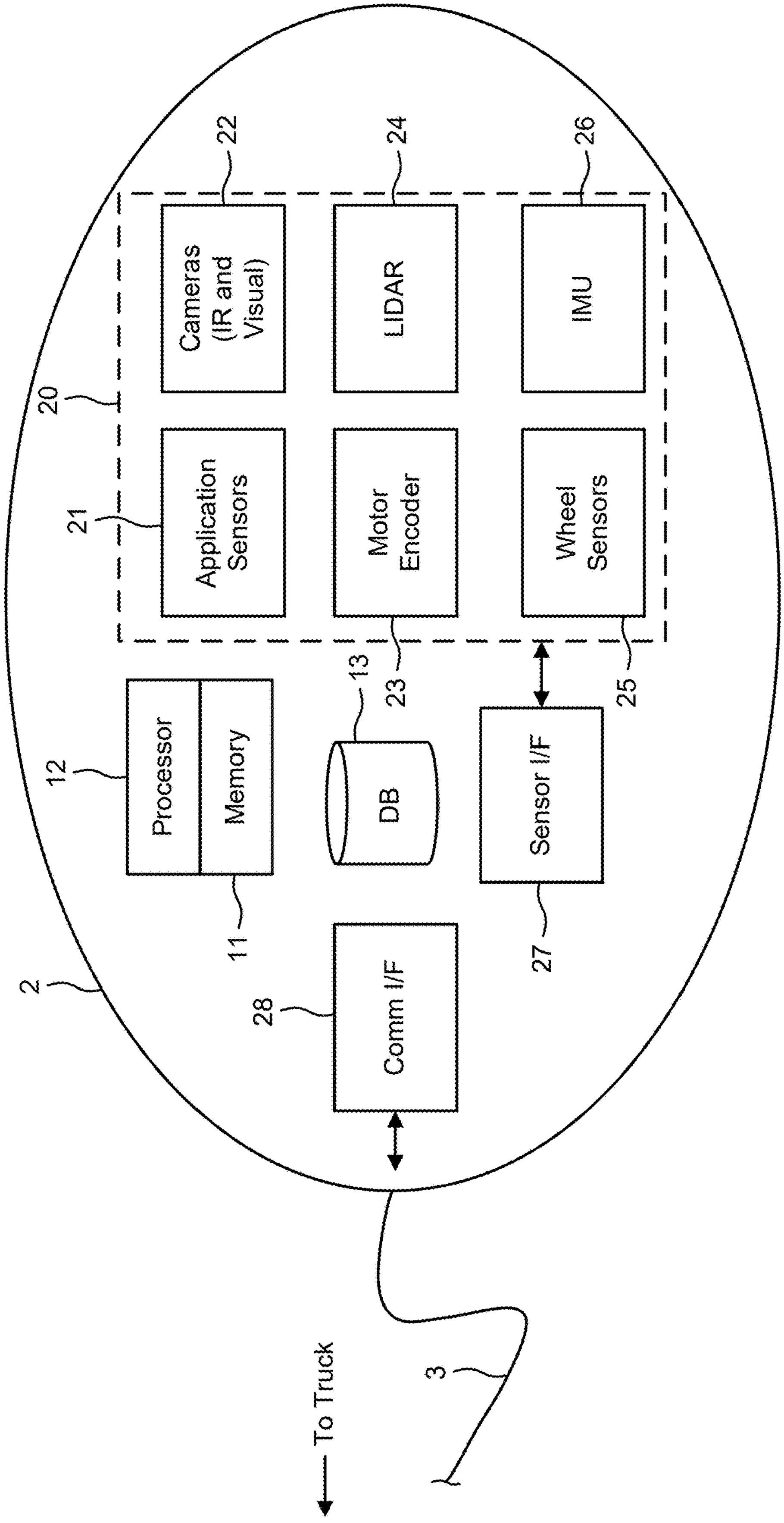
FIG. 2*a* is an exemplary schematic diagram of a robot having a processor and multiple sensors configured to practice the system and method of the present disclosure.

With reference to FIG. 2*a*, there is shown an exemplary robotic system 2 having multiple sensors contained therein. While the exemplary system of FIG. 2 is shown with a plurality of discrete sensors shown collectively as sensors 20 integral to robot 2, it will be understood that the sensors in accordance with the present disclosure may include on-board sensors, attached sensors, or remote sensors. As set forth in more detail with respect to FIG. 15, the sensors may be affixed to an arm extending from the body of the robotic system 2.

Among the exemplary sensors shown in FIG. 2, there are shown LIDAR sensors 24, IMU sensors 26, wheel sensors 25, motor encoder sensors 23, cameras (both infrared and visual) 22, and application specific sensors 21. Each of these will be described in greater detail below.

Also shown is a sensor interface 27 which may, for example, be communicatively coupled, directly or indirectly, to each of the sensors 20. The sensor interface 27 may receive raw sensor data from each of the sensors 20 and store the raw sensor data in database 13. The sensor interface 27 may also convert the raw sensor data received from each of the sensors 20 into a format for further processing by processor 12 and memory 11. The sensor interface 27 may also include a bi-directional communication path to sensors 20 to provide control and commands to the sensors 20. For example, the processor 12 may process data received from a visual camera 22 through sensor interface 27 and then issue a command to the visual camera 22 to change its focal point or orientation to create additional camera inputs for processing. Other command and control functions from the processor to the sensors are contemplated by the present disclosure.

The sensors may be calibrated from time to time. Factory calibration may occur at the time of manufacture or re-calibrated to factory settings at the time of deployment. Additionally, field calibration may also be performed. For example, the processor 12 may use known historical data in the database 13 to recalibrate one or more sensors 20 in the field. So, if, for example, there is a disparity between a motor encoder sensor 23 reading and an IMU sensor 26 reading due to slippage, either or both of those sensors may be recalibrated to harmonize the readings.

Also shown in FIG. 2*a* is a communication interface 28. The communication interface 28 may be a wired or wireless communication interface that provides bi-directional communication to an external computer network or server (not shown). For wired communication, the communication interface 28 may include logic for communicating through tether 3 of FIG. 1. In an aspect, the communication interface 28 may communicate with truck 7 of FIG. 1 using Ethernet protocols. For wireless communications, the communication interface 28 may include one or more wireless communications functions and protocols, including cellular, which may be 5G cellular, wide area network protocols, local area network protocols, near field communication functionality and protocols, wi-fi, and/or Bluetooth functionality.

The robot 2 may include a processor 12 and memory 11 combination that may work in tandem in which the memory 11 stores instructions which, when executed by the processor 12, perform the functions described herein. Such functions may include the command and control of the sensors 20. Such functions may also include the processing in real time, or near real time, of sensor data collected by the various sensors 20. In an aspect, there may be one or more central processing units (CPUs). Additionally, there may be a combination of one or more CPUs and one or more graphics processor units (GPUs). The processor 12 may be a Nvidia® Jetson Xavier NX processor(s). However, the disclosure and associated claims shall not be limited to any particular configuration of processors.

The on-board processing of sensor data may provide for low latency of sensor data processing. For real-time or near real-time processing, the processor 12 may include a direct interface to the sensor interface 27. For other functions, the processor 12 may include a direct interface to the database 13 and perform operations on stored data. Such stored data may include, for example, historical sensor data used for calibration or continued training of artificial intelligence/machine learning algorithms.

In an embodiment, the processor 12 may perform iterative processes to combine sensor data from multiple types of sensors 20 to develop estimates of the position and orientation of the robot 2 within the scanning environment and may store that in the database 13. A mapping of the environment, including, for example, the interior 6 of the pipe 5 of FIG. 1, and the detection of objects in the environment may be performed by the processor 12 using sensor data collected from multiple sensors 20. The map may include objects, services, features, landmarks and/or other relevant information, which may vary based on the particular application of the technology. As the robot 2 moves through the environment, the various sensor readings may be aggregated to build a virtualized 3D representations of the scanned locations to perform mapping, feature recognition, and other functionality.

Figure 2B:
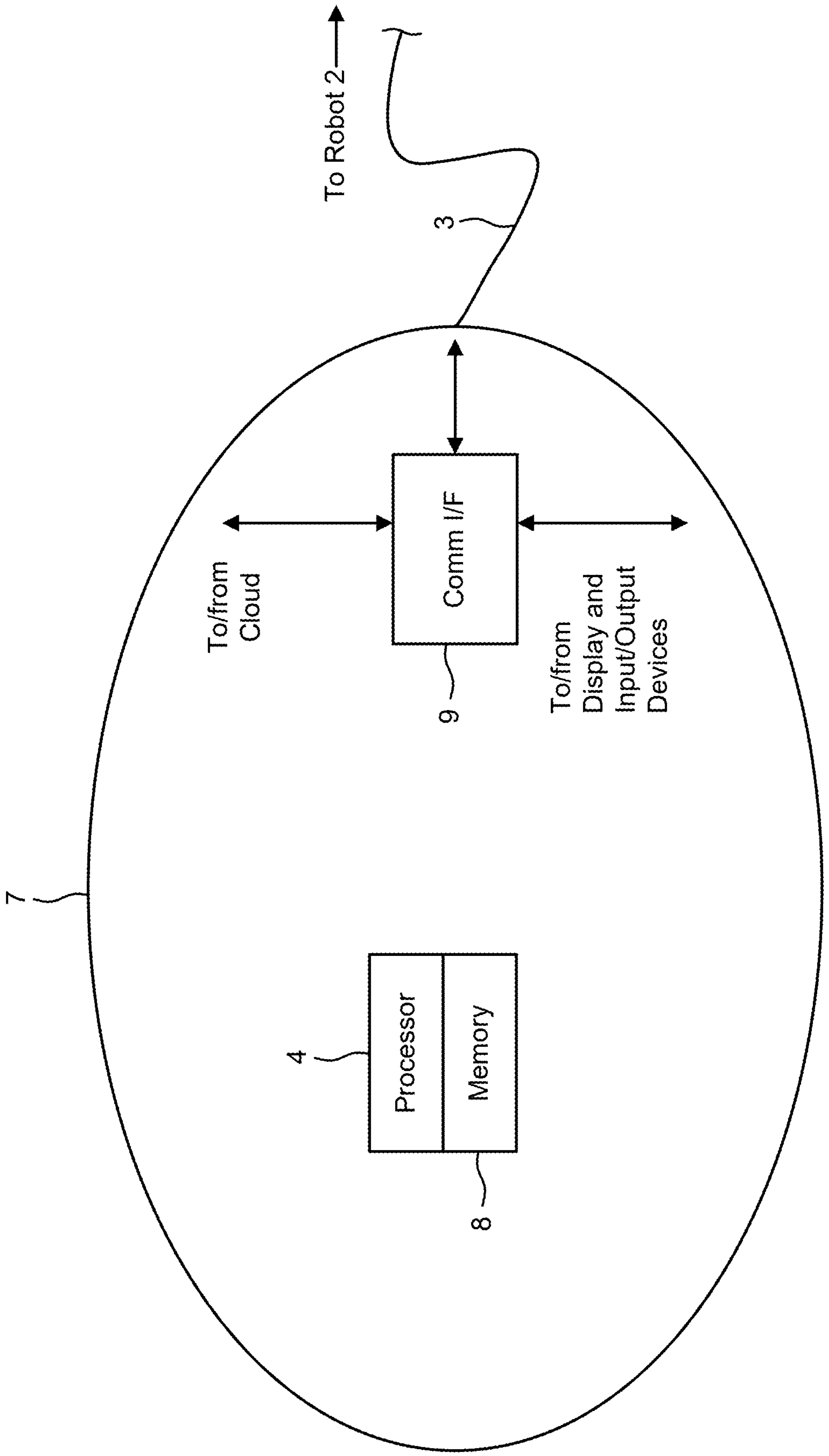
FIG. 2*b* is an exemplary schematic diagram of a truck tethered to robot having an on-board processor.

In an embodiment, the robot 2 may be connected via the tether 3 to the truck 7 of FIG. 1. With reference to FIG. 2*b*, the truck 7 may sit outside or at an opening to the pipe 5 of FIG. 1. The truck 7 may be stationary relative to the robot 2 and the pipe 5. The truck 7 may include a communication interface 9 which enables communication with robot 2 through communications interface 28. In an aspect, the protocol between communication interface 9 and communication interface 28 may be Ethernet or any other suitable wired and/or wireless communication protocol. Another protocol may include a controller area network (CAN). It will be understood that the communication may be wireless, wired, or both depending on the application. The communication interface 9 may also include communication functionality to and from a cloud computing platform (not shown) and to/from a display and/or other input means such as a keyboard, touchscreen, of voice processor (not shown).

Also shown in FIG. 2*b* are a processor 4 and memory 8 combination that may work in tandem in which the memory 8 stores instructions which, when executed by the processor 4, perform the functions described herein. Such functions may include processing of sensor data provided by the robot 2. The processor 4 may, for example, be a Nvidia® processor(s) such as Jetson Xavier NX. Both the processor 12 and the processor 4 may operate in tandem and/or in parallel to process sensor data. As a design choice, the processor 12 may be assigned the processing of certain functions while the processor 4 is assigned the processing of other functions. Alternatively, or additionally, each processor may be assigned similar processing or all processing may be performed in either the processor 12 or the processor 4. The disclosure and associated claims shall not be limited to any particular configuration of processors or division of functionality between the processors. Likewise, each processor may consist of one or more GPUs and/or one or more CPUs.

Real Time Human Feedback Augmentation. While the systems and methods of the present disclosure are able to work independently of human intervention, there are times when immediate, real-time human feedback is advantageous. For example, the truck 7 shown in FIG. 2*b* may have an interface from communications interface 9 to a display and/or other input/output devices (not shown). Additionally, or alternatively, the communication interface 28 on robot 2 in FIG. 2A may interface directly or indirectly with a display and/or other input/output devices.

During an automatic scanning operations, a display and input device connected may enable an operator viewing the display to label data in real time. For example, an operator having access to a known pipe schematic layout may be able to label a feature such as a lateral or joint in real time based on the real-time display output. Additionally, AI algorithms may combine operator input with AI inputs to develop a more powerful scan operation. AI algorithms may also correct human operator input as needed. Likewise, human operator input and feedback may lead to a more refined AI output and train a better AI algorithm model over time.

Figure 7:
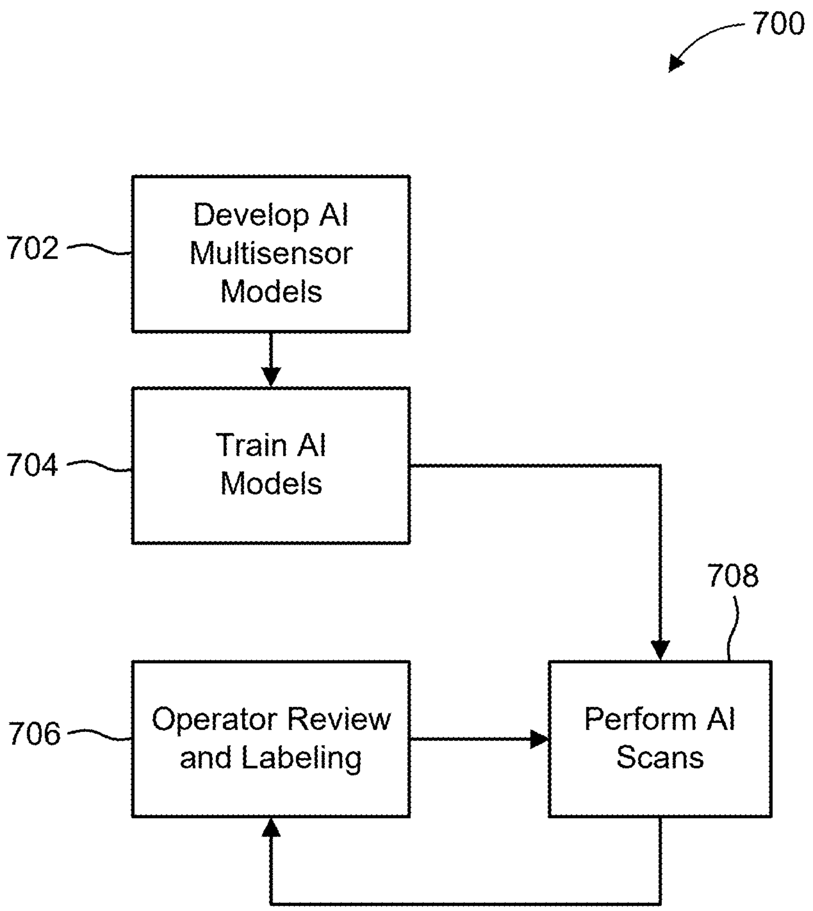
FIG. 7 is an exemplary flow diagram of an operator/artificial intelligence feedback loop for enhancing the quality of the AI model predictions.

An exemplary process 700 is shown in FIG. 7. At 702, an AI algorithm having multiple sensor inputs is developed. AT 704, the AI algorithm is trained using a known data set. At 708, a scan is performed using the trained AI algorithm. At 706, a human operator may review and label the scan. The process may continue in a loop whereby additional scans using the AI algorithms are performed at 708 and reviewed by human operator at 706. The human operators may update the output of the scans and the AI algorithm may adjust the human operator input resulting in a more improved modeling of the pipe or other environment.

Functionality. The sensors and algorithms of the present disclosure may vary based on the particular application. For example, in an embodiment, the configuration of sensors may be designed to map out a confined space and there may be application specific sensors to detect harmful gasses. In another embodiment, the configuration of sensors may be to map out oil and gas pipelines with application specific sensors. In yet another embodiment, the configuration of sensors may be to map pipelines used for sewer lines, with application-specific sensors such as a pressure sensor(s) for leak detection.

Application specific sensors may, for example, include odor/gas sensors, manometer sensors for pressure readings which may be useful for gas lines, barometer sensors for air pressure and air pressure changes, moisture sensors which may be useful for leak and infiltration detection, and ultrasound sensors which may be useful in detecting cracks.

Spatial Awareness and Location. In order to mark the positions of any observations of features or anomalies, the system of the present disclosure provides spatial awareness in order to determine the relative location of all detected sensor readings. Localization and position detection may be performed using visual or point-cloud data by location of features. The localization can be mapped to a prior mapping (see re-scan) or can be done via simultaneously localization and mapping (SLAM). SLAM will predict the robot's pose (e.g., position and orientation) in relation to the pipe.

One feature that provides a more accurate spatial awareness is the tracking of distance that the robot 2 has traveled within the pipe 5. In an embodiment, the distance traveled may be computed in an absolute sense, meaning that the distance is measured from the location in which the scanning process starts. Alternatively, or additionally, the distance may be measured as a relative position between any two or more observation points. The specific methods for tracking distance may vary. The robot 2 may operate free of direct interaction from GPS systems or other globally location aware systems so the software may combine the measurements from accelerometers, gyroscopes, wheel encoders, and other sensors to estimate the object's velocity and orientation changes. By continuously updating the robot's position based on its previous known position and its measured motion, the robot can provide an accurate and continuous position.

For wheeled robots, as they move down the pipe the axles may rotate and this rotation may be tracked with an encoder or similar sensor. There may be a gearing between the motor and the wheels, so this measurement may either be directly on the axle or may be on the drive motor shaft or some combination. Wheeled systems may slip due to obstructions, incline or a variety of other reasons. So, the exact position of the robot may use the wheel readings augmented with other positional sensors to detect and compensate for the wheel slippage.

Distance and positional sensing may also be provided through IMU sensing. For example, accelerometers associated with the IMU may measure linear acceleration along multiple axes, providing information about the robot's movement. One or more on-board gyroscopes may measure angular velocity around each of the multiple axes, indicating rotational motion. Within the software processing the robot will fuse the sensor data and apply necessary filtering to predict and track the robot's position, velocity, orientation and other key metrics.

Calibration and Recalibration. The detection of known positions or features may be used for automatic online calibration of the sensors and the robot. When the robot is placed into an environment in which there exists a cache of historical sensor scanning data, the historical sensor scanning data may be used as a cross-reference for the current sensor scanning data. The historical and current scanning data may have a common zero reference point to act as a starting anchor point from which all readings may be referenced. The robot may take the detect position of a feature detected between the previous and current scanning data and reset the relative position of the data sets so the common feature acts as a newly aligned reference point. This will allow the robot to more accurately reposition itself within scan and between each set of features.

The zero-reference point and/or the related positions may have some error in the readings. The robotic system may incorporate error compensation techniques to mitigate sensor errors, such as bias, noise, or drift. Such techniques may involve sensor calibration, dynamic model refinement, and/or adaptive algorithms to improve the accuracy and reliability of the position estimation. The robot may be calibrated with known ground truth readings and tested to apply the necessary correction/offset values.

Combining IR and Visual Sensor Data. In an aspect, the IR camera outputs and the visual camera outputs from sensor 22 may be combined into one image. In the case of a multi-sensor application, each of the IR camera and visual cameras attached to a robot 2 may have a different orientation, perspective and field-of-view of the environment being scanned. To combine into one cohesive image, a transformation function may be defined.

Figure 9:
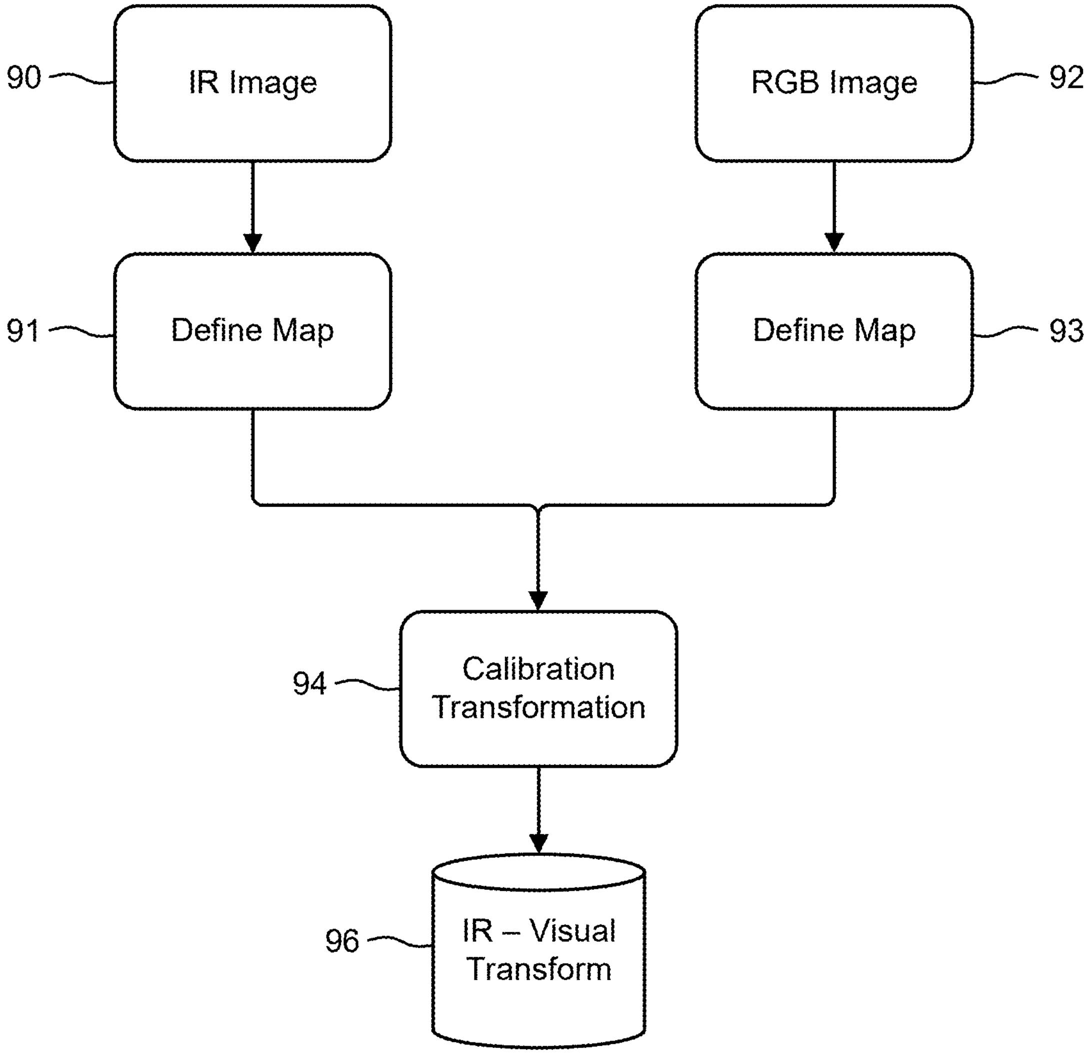
FIG. 9 is an exemplary flow diagram showing the combining of IR and RGB image data.

With reference to FIG. 9, there are shown two processing legs, one for IR image processing and one for RGB image processing. With respect to IR imaging, the IR image data is captured at 91. At 92, the IR image is mapped to a 3D space. With respect to the visual RGB image, the RGB image data is captured at 93. At 94, the RGB image data is mapped to a 3D space. At 95 the RGB image data and the IR Image data are combined and a calibration is performed. The result of the calibration transformation is then stored in database at 96. The calibration transformation accounts for any differences detected between the respective encoders associated with each the sensors and the IMUs associated with each of the sensors. The calibration transformation accounts for differences in the respective frames of reference between the IR camera and the RGB visual camera. The calibration transformation also accounts for differences in the respective perspectives of the IR camera and the RGB visual camera.

Figure 10:
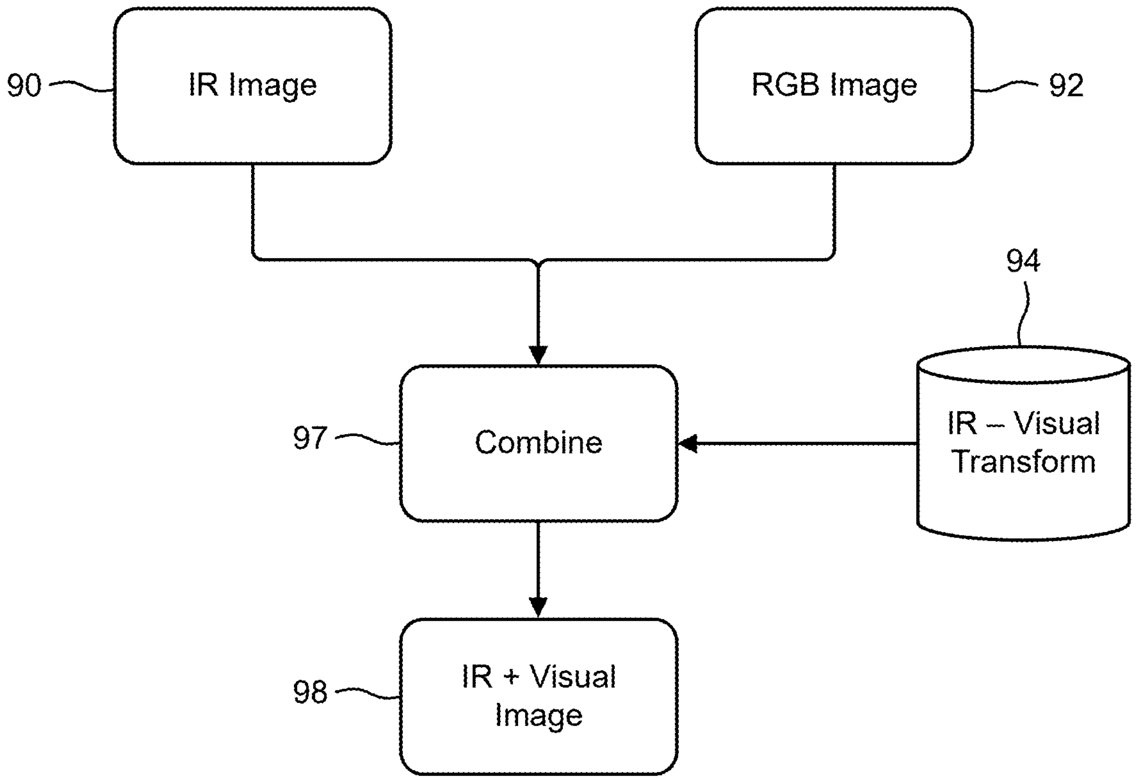
FIG. 10 is an exemplary diagram using the IR-Visual transformation function of FIG. 9 to create a combined IR-Visual Image.

Once the calibration transformation function has been calculated, it is used in the overlay function as shown in FIG. 10. The IR image 90 and the RGB image 92 are combined at 97. The IR-Visual transformation function 94 is applied to the combination at 97 and the combined output is displayed at 98.

Figure 11:
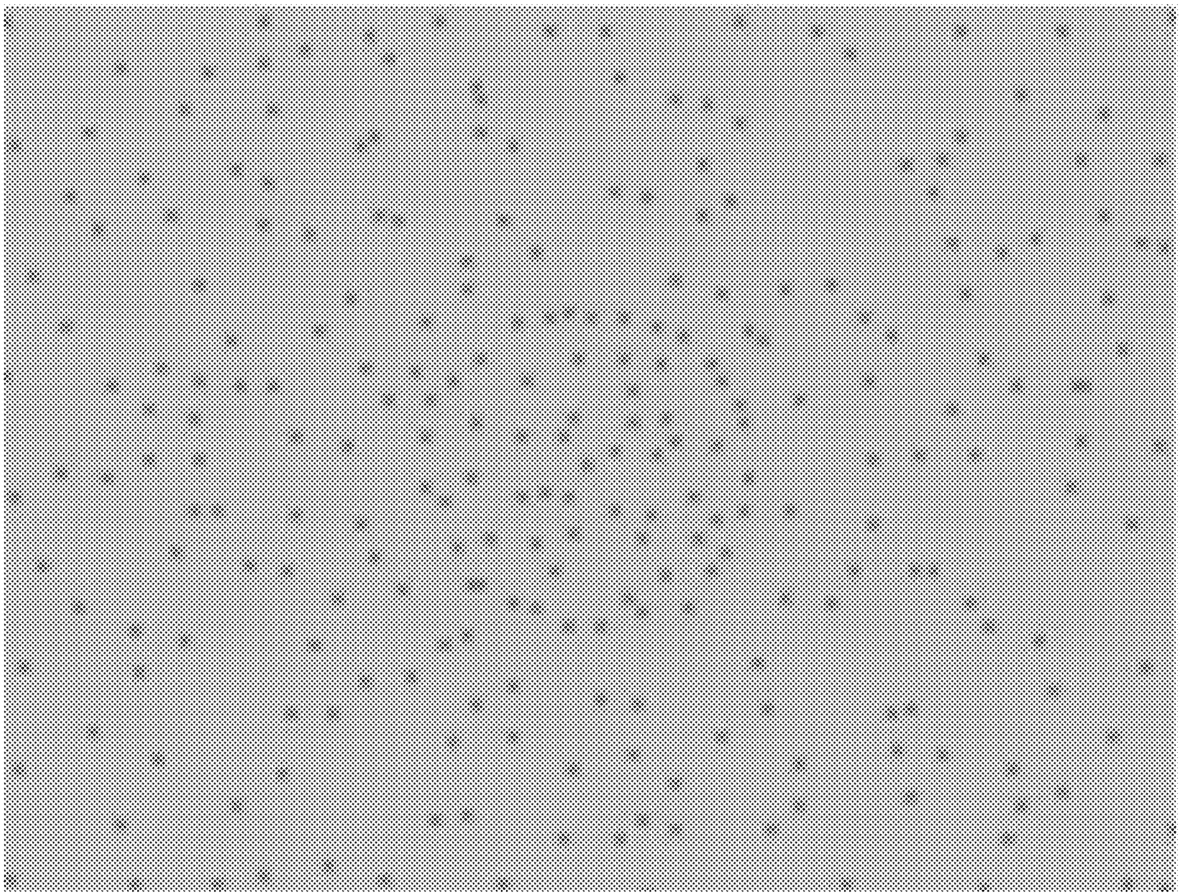
FIG. 11 is a map of a points associated with visual image captured by the RGB image sensor.
Figure 12:
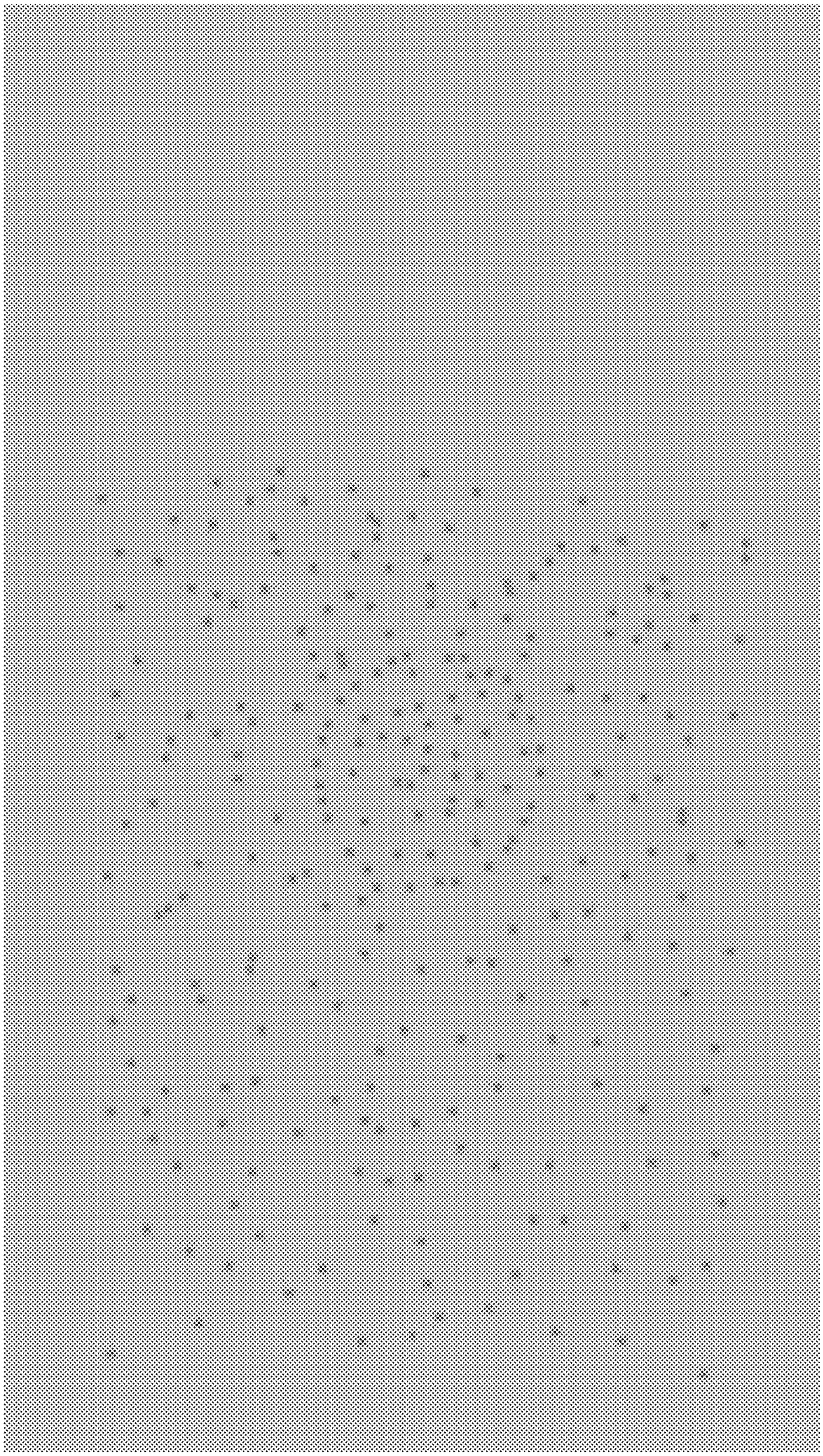
FIG. 12 is a map of a points associated with an IR image captured by the IR sensor.
Figure 13:
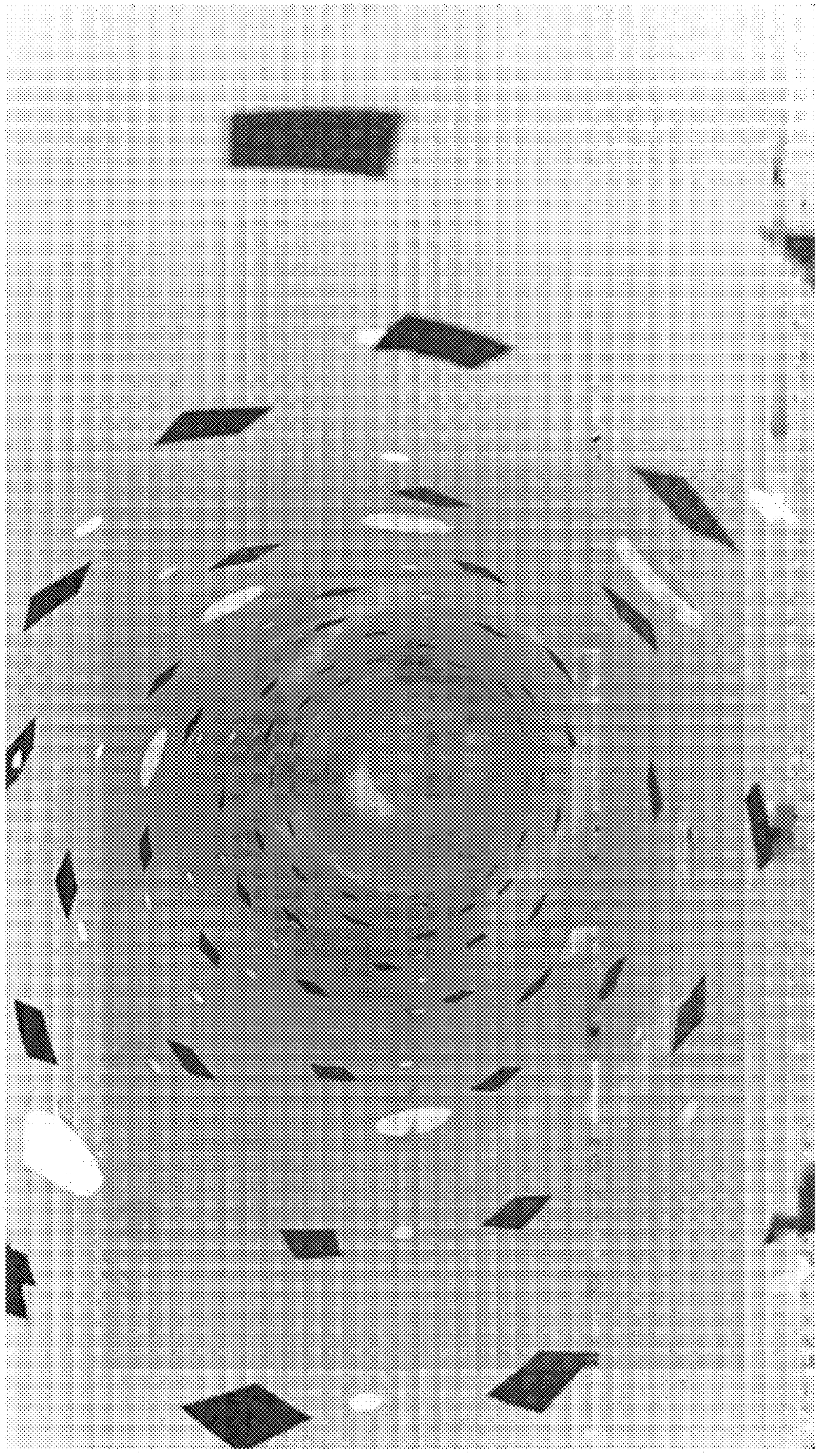
FIG. 13 is a map of the combination of an IR and visual image display.

FIG. 11 shows an exemplary image of the RGB data. FIG. 12 shows an exemplary image of the IR data. FIG. 13 shows the combined RGB data and IR data with the visual transformation function applied.

The creating an infrared image step may include enhancing the contrast of the infrared image, performing noise reduction with respect to the infrared image, enhancing the infrared image using histogram equalization and/or dynamic range compression.

The creating the visual image step may include enhancing the contrast of the visual image, performing noise reduction with respect to the visual image, enhancing the visual image using histogram equalization and/or dynamic range compression.

The calibration step may include color/grayscale mapping. There may also be specific application processing. There may also be user preference associated with a visual display. Additional processing may include determining regions of interest, zooming, and panning. Image analysis tools such as object detection, segmentation and tracking algorithms may also be used.

Mapping. A map of the pipe and the robot's detection of objects may be gathered using the collected sensor data. The map may include objects, services, features, landmarks, or other relevant information depending on the specific implementation. As the robot moves through space the sensor readings may be aggregated and saved to build a virtualized 3D representation of locations which have already been scanned 3D Modeling. A map of the pipe and the robot's detection of objects will be gathered using the collected sensor data. The map may include objects, services, features, landmarks, or other relevant information, depending on the specific implementation. As the robot moves through space, the sensor readings can be aggregated and saved to build a virtualized 3D representation of locations which have already been scanned. A digital twin schematic representation of the pipe may be created using a collection of sensor data sets which are fused together through a series of iterative processes. The robotic system combines one or more sensor measurements within the scanning environment and records all of that information.

Figure 3:
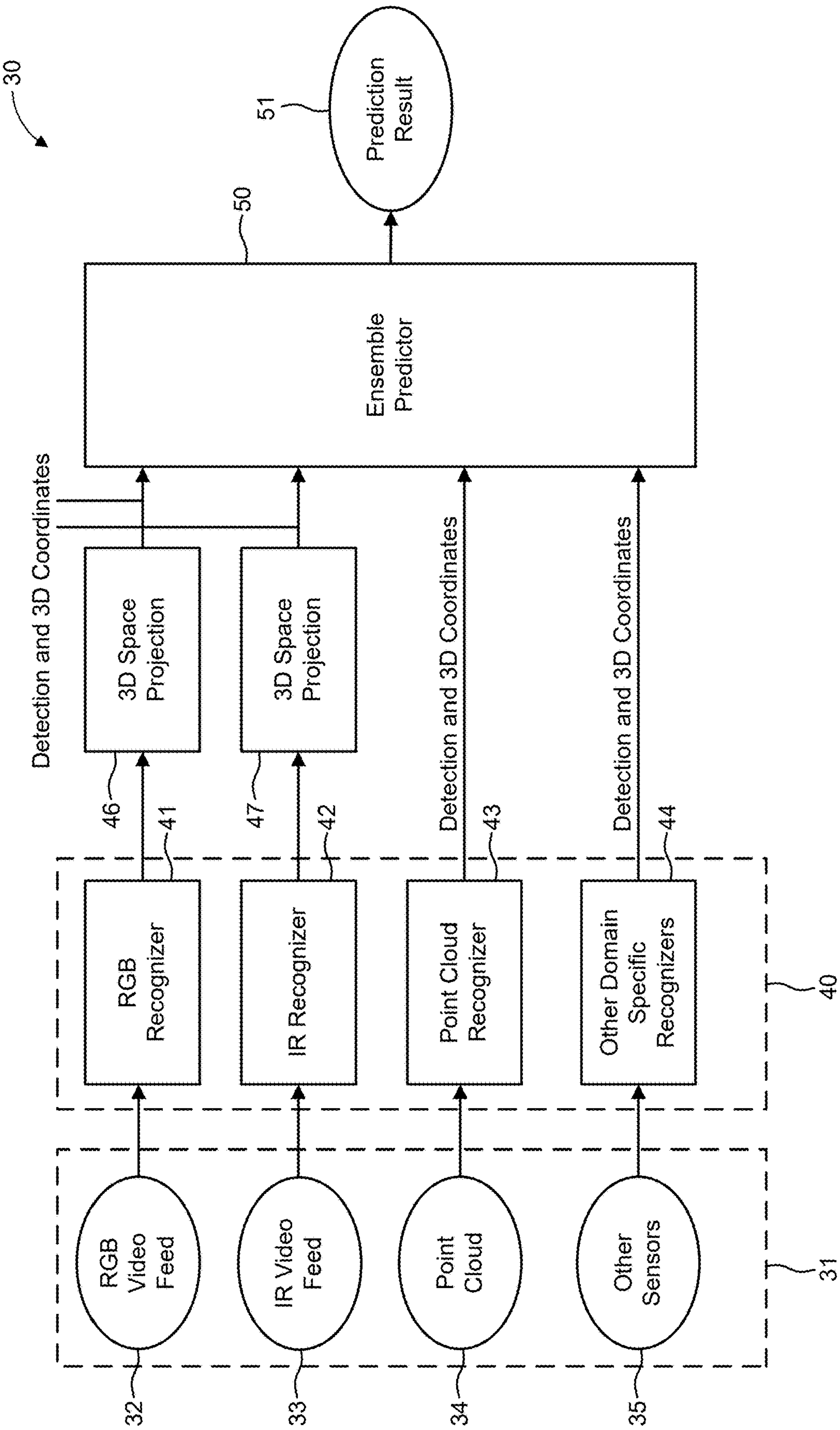
FIG. 3 is an exemplary flow chart of the algorithms which may be deployed for practicing the methods of the present disclosure.

Methods of Operation. FIG. 3 shows an exemplary flow chart using deep learning-based feature recognizers to process the sensor data coming from multiple sensors 20. By acquiring and using training data across multiple sensors, various sensor data may be embedded to produce one feature vector that represents multiple data relating to the feature detected. In an embodiment, RBG sensor data, point cloud data, IR and visual camera data, IMU data, and application domain specific sensors may be embedded in a single space to produce a feature vector that represents the pipe (or other environment) features. Using the feature embedding and the historical training data collected from the sensors 20, a deep neural network model may be created to automatically map and detect pipeline features in real time.

Shown in FIG. 3 are a plurality of exemplary sensor outputs 31, including RGB video feeds 32, IR video feed 33, point cloud data 34, and other sensor data outputs 35, which may, for example, include any of the sensors described above or be domain specific sensor outputs. Each of the sensor outputs 31 may be proceeded by one or more corresponding recognizers 40, including an RGB recognizer 41 associated with the RGB video feed 32, an IR recognizer 42 associated with IR video feed 33, a point cloud recognizer 43 associated with point cloud data 34, and other domain specific recognizers 44 associated with other sensor data 35. The recognizers 40 are described in greater detail below.

Continuing with the description relating to the flow diagram of FIG. 3, the outputs of the RGB recognizer 41 and the IR recognizer 42 are projected into a 3D spatial representation 46 and 47, respectively. The outputs of the 3D space projections, along with the outputs of the point cloud recognizer 43 and the other domain specific recognizers 44, include detection of features and associated 3D coordinates of associated with those features. The features and their respective coordinates are then sent to the ensemble predictor 50 which combines and weights the features and coordinates to produce a vector prediction result 51. The ensemble predictor is also described in more detail below.

It will be understood that the flow diagram in FIG. 3 is exemplary only and is simplified for the purposes of clarity. FIG. 3 is not intended to limit the disclosure to only such data processing flows. For example, the sensor data is not limited to that shown in FIG. 3, and multiple sensors may be input into one or more recognizers. Likewise, the identification of the recognizers in FIG. 3 is non-limiting and the recognizers deployed in accordance with the disclosure may include some of all of the recognizers shown in FIG. 3 as well as additional recognizers not shown in FIG. 3. The disclosure and the scope of the claims shall not be limited to only what is shown with respect to FIG. 3.

RGB Recognizer. The RGB recognizer 41 functionality may be designed to receive 2D RGB sensor data from a video camera feed and produce bounding boxes and 2D coordinates of the features and defects within the operating environment. In an embodiment, a deep learning model using pipeline inspection video frames may be used to detect features and defects based on the RGB video feed. The deep learning model may be trained using historical data from the same or similar environments. In accordance with the present disclosure, the performance of the deep learning module and the rate of receipt of the RGB video feed is such that the algorithm is able to produce object detection results in real time at thirty (30) frames per second. An example of the output of the RGB recognizer 41 is shown in FIG. 7.

Figure 4A:
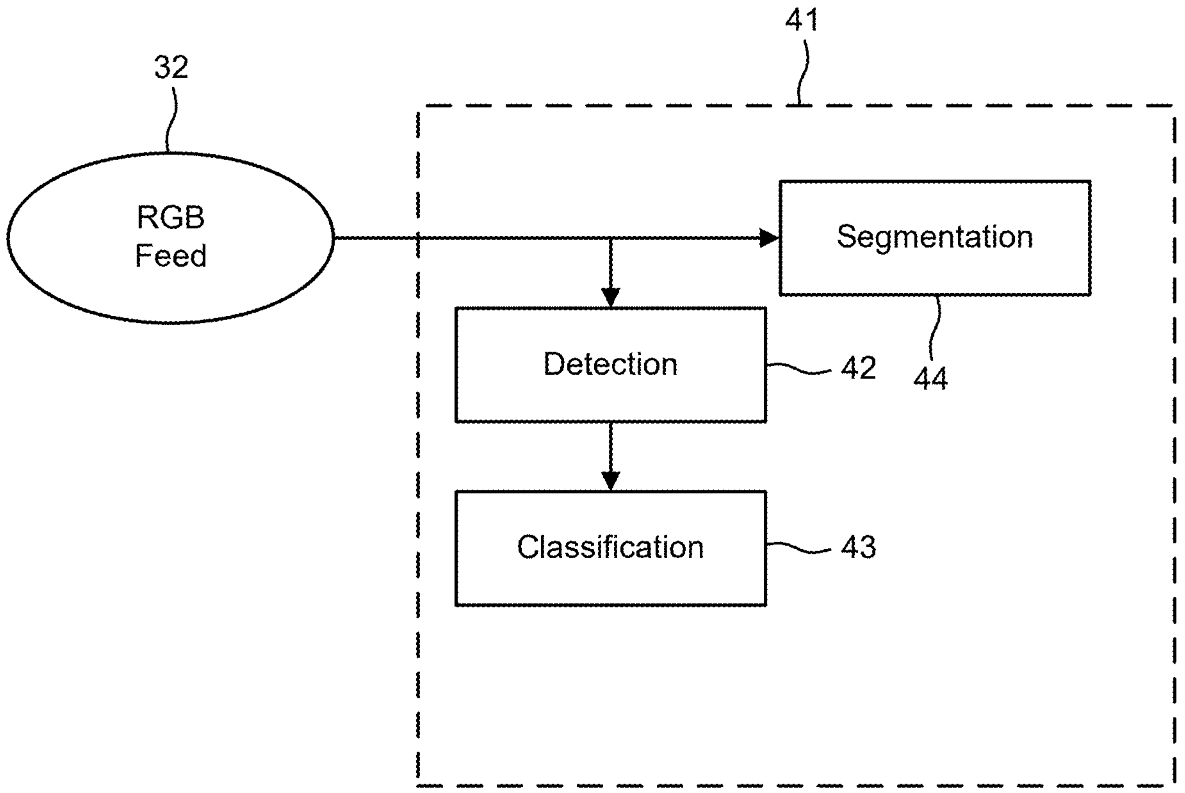
FIG. 4*a* is an exemplary flow chart for the processing in an RGB recognizer.
Figure 4B:
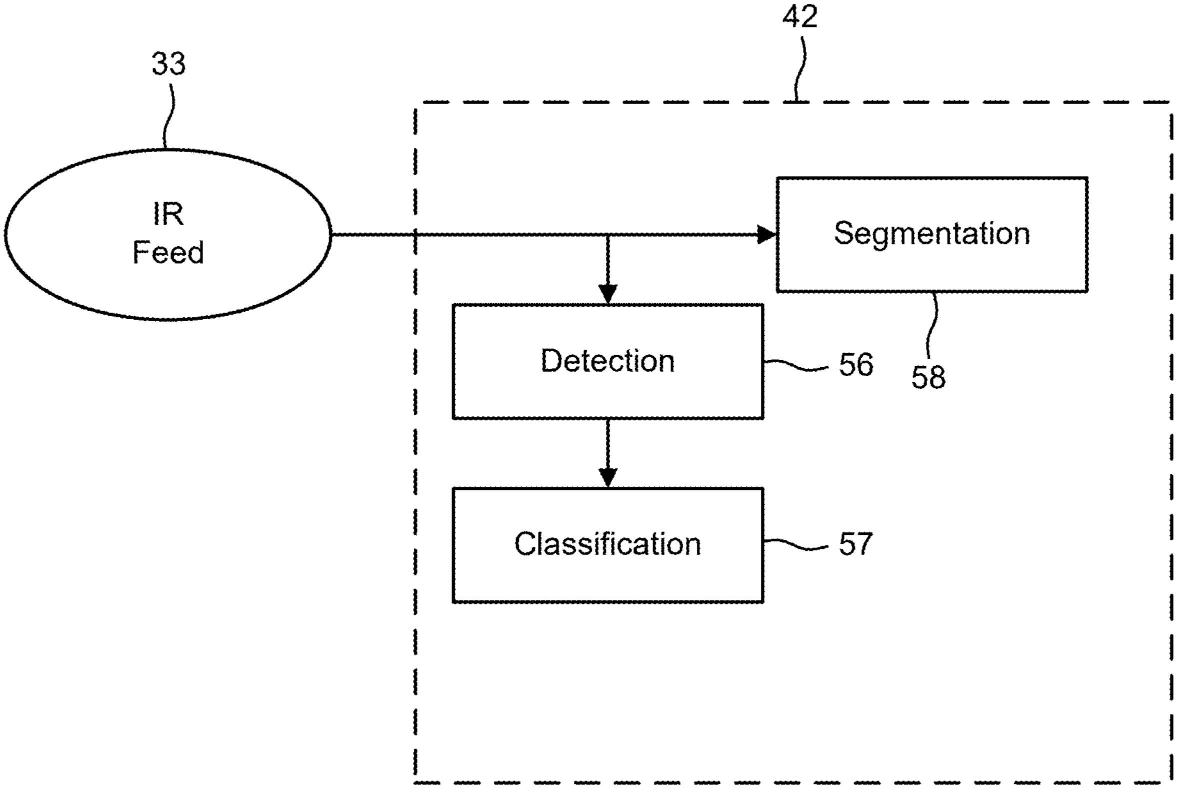
FIG. 4*b* is an exemplary flow chart for the processing in an IR recognizer.

The RGB recognizer 41 is shown in more detail in FIG. 4*a*. The RGB recognizer 41 may, for example utilize a YOLO algorithm, a form of a convolutional neural network (CNN), to detect features. In an aspect, YOLO v. 8 may be used. For example, the RGB feed 32 may be input to a detection function 42. The detection function 42 may detect various features of a RGB data received from the RGB feed 32. For example, image pixels, or corresponding representations of the image pixels, received from the RGB feed 32 may be analyzed to determine a feature is located in a given pixel. The analysis may include comparing the pixel to neighboring pixels, identifying color counts (e.g., R value, G value, B value) of a pixel, determining a brightness value for the pixel, and the like. The results of the detection function 42 may then be passed to the classification function 43. The classification function 43 may, for example, determine one of five categories into which the detected feature may be found. In some cases, the classification function 43 may map the determined classification category into one of 3 subcategories.

Image segmentation 44 may, for example, be based on color or contrast. In a deep learning model, a neural network may be used to extract features using an encoding algorithm, then decoding those features corresponding to the input feed 41, and long-range neural network connections to produce scale and increase accuracy. Convolution layers may be used to encode each digital feature which may, for example, capture edges to produce feature vectors. While CNNs may be used, other types of deep learning neural networks may also be utilized. In some cases, the image segmentation 44 may occur in parallel to the operations of the detection function 42 and the classification function 43.

In an aspect, the recognizer 41 may determine an appropriate Pipeline Assessment & Certification Program ("PACP") codes developed by Nassco. Such PACP codes are known in the industry and may indicate factures, cracks, deformed, or collapsed pipes, among other features within a pipe system.

Figure 8:
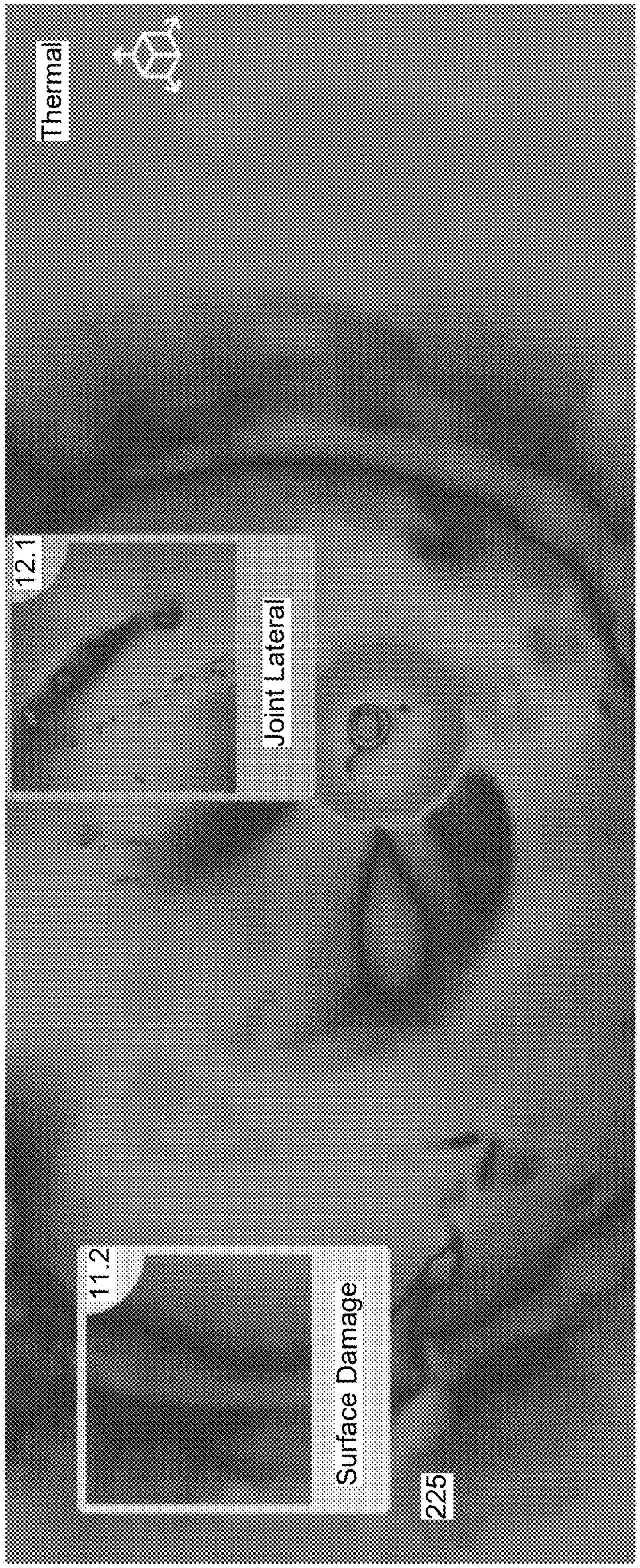
FIG. 8 is an exemplary display of an infrared video feed captured by an infrared camera inside the exemplary environment of a pipe.

Infrared Recognizer. The infrared recognizer functionality may be designed to receive 2D IR sensor data and produce bounding boxes and 2D coordinates of the features and defects within the operating environment. The IR video feeds from one or more cameras 22 may be used by a deep learning model to detect features and defects within the environment. The deep learning model may be trained using historical IR video imagery from the same or a similar environment. An example of the output of the IR recognizer 42 is shown in FIG. 8.

The infrared recognizer 42 may operate on the same principles and in accordance with the same exemplary process as the RGB recognizer 41 as shown in FIG. 4*a*. The IR recognizer 42 may, for example, utilize a YOLO algorithm to detect features. YOLO v. 8 may be used. For example, the IR feed 33 may be input to a detection function 56, which may detect various features contained in the IR data. The classification function 57 may, for example, determine one of five categories for classifying the detected feature. The classification function may also determine a subcategory for the detected feature (e.g., 1 of 3 subcategories). After identification of the subcategory, the process may continue at the segmentation function 58. Image segmentation 58 may, for example, in this case be based on temperature gradients which then may be color-coded. In a deep learning model, a neural network may be used to extract features using an encoding algorithm, then decoding those features corresponding to the input feed 41, and long-range neural network connections to produce scale and increase accuracy. Convolution layers may be used to encode each digital feature which may, for example, capture edges to produce feature vectors. While CNNs may be used, other types of deep learning neural networks may also be utilized. In some cases, the image segmentation 58 may occur in parallel to the operations of the detection function 56 and the classification function 57.

The infrared recognizer 42 may detect features that are not present within a pipe but may be obscured behind a barrier. Moreover, the infrared recognizer may detect features that an RGB recognizer 41 is not able to do. For example, water collecting behind a pipe may be detected by an infrared recognizer 42 and not an RGB recognizer 41.

Point Cloud Recognizer. As will be appreciated by those skilled in the art, a point cloud is a discrete set of data points in 3D space. Point clouds may be generated by 3D scanners or by software which measures a plurality of points on an external surface of an object around them. In an embodiment, the point cloud may be generated by any spatial distance sensor. In an embodiment, a LIDAR sensor or camera may be used. However, other spatial distance sensors may include ultrasonic, stereoscopic vision, or other methods for generation of point clouds. A point cloud recognizer 43 may include using artificial intelligence algorithms such as deep neural networks to transform point cloud data to 3D bounding boxes and 3D coordinates of the features and defects in the surrounding environment.

In an embodiment, a point cloud may represent a section of a pipe. Using either a heuristic-based approach or a deep-learning based approach, predictions of the pipe's features and defects may be produced. In a deep learning-based approach, historical point cloud data collected using sensors 20 in real pipes may be used as training data.

Figure 5:
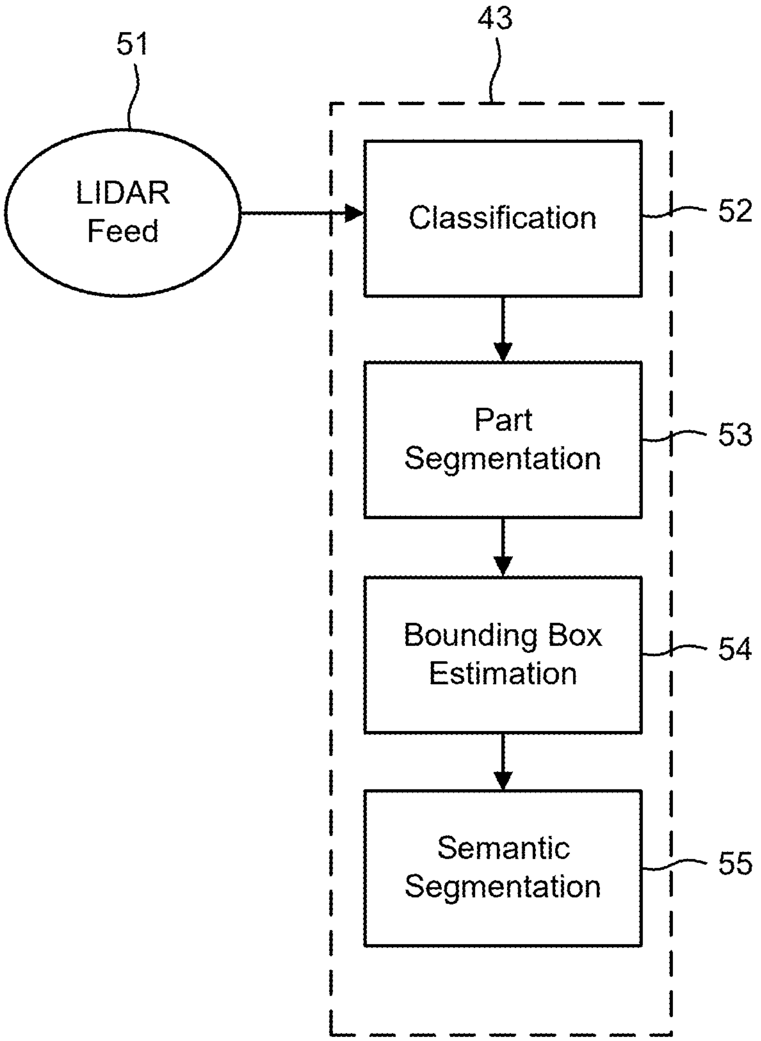
FIG. 5 is an exemplary flow chart for the processing in a point cloud recognizer.

In an aspect, the point cloud recognizer 43 may use the PointNet architecture or a variant thereof such as PointNet++. With reference to FIG. 5, there is shown LIDAR feed 51 passed to the point cloud recognizer 43. A 52, a high-level classification is performed. At 53, part segmentation is performed. At 54, a bounding box estimation is applied. At 55, semantic segmentation is performed. The result is a 3D model that provides feature detection and identification.

3D Space Projection. Prior to outputs from the infrared recognizer 42 and the RGB recognizer 41 being input to the ensemble predictor 50, those 2D recognizer outputs are mapped and projected into 3D space. The projected 3D location may be a function of camera position, camera field of view angle, pipe diameter, unding box coordinates.

Figure 14:
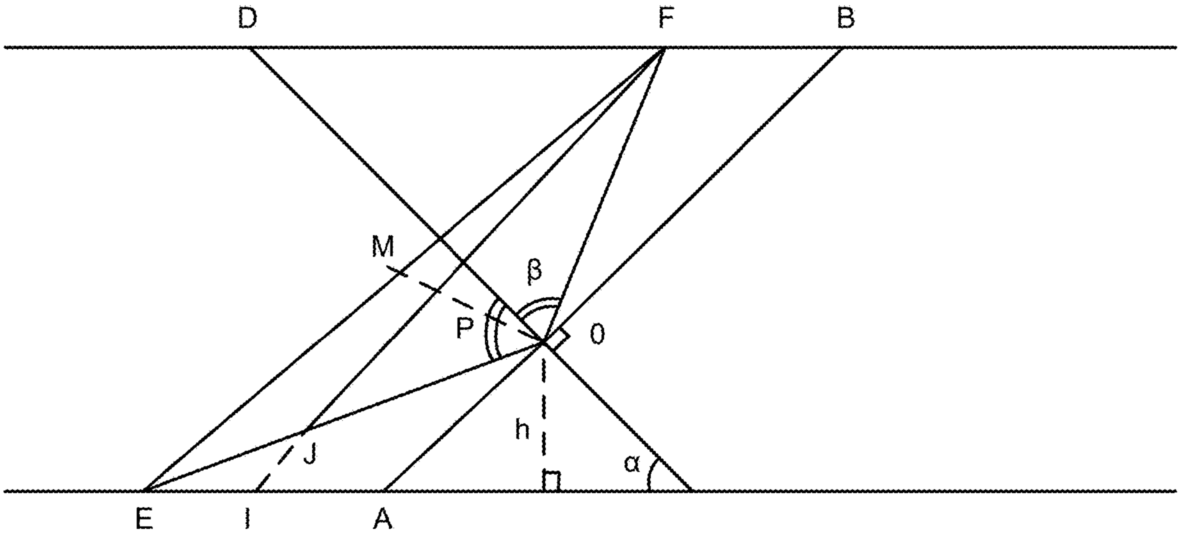
FIG. 14 is a diagram showing the projection of 2D spatial detections into 3D spatial detections.

With reference to FIG. 14, there is shown a schematic diagram of projecting a 2D recognizer output onto a 3D space. In an aspect, the physical center 3D of a pipeline is determined as represented by point M. The point M may then be mapped to Point P within a 2D image, based on the predetermined parameters of the camera and the pipeline diameter, After that, a bounding box position may be created and shifting the center of that bounding box position to center P.

Ensemble Predictor. The combination of the various recognizer outputs may be combined in the ensemble predictor 50 in which a linear rule-based model combines the prediction results from each of the afore-mentioned recognizers. The ensemble predictor 50 may combine the sensor data and the recognizer outputs to cross-reference readings to ensure or increase accuracy. Additional cross-references between 2D pixels and 3D coordinates may also be performed.

Weights may be assigned to each of the different recognizer outputs to derive a result with a predicted confidence level. The rules may be adopted, tested and updated through actual test data accumulated from the various sensors 20. The result of the processing of high quality, multi-modal data collected from the sensors within the pipe may be an optimized.

Figure 6:
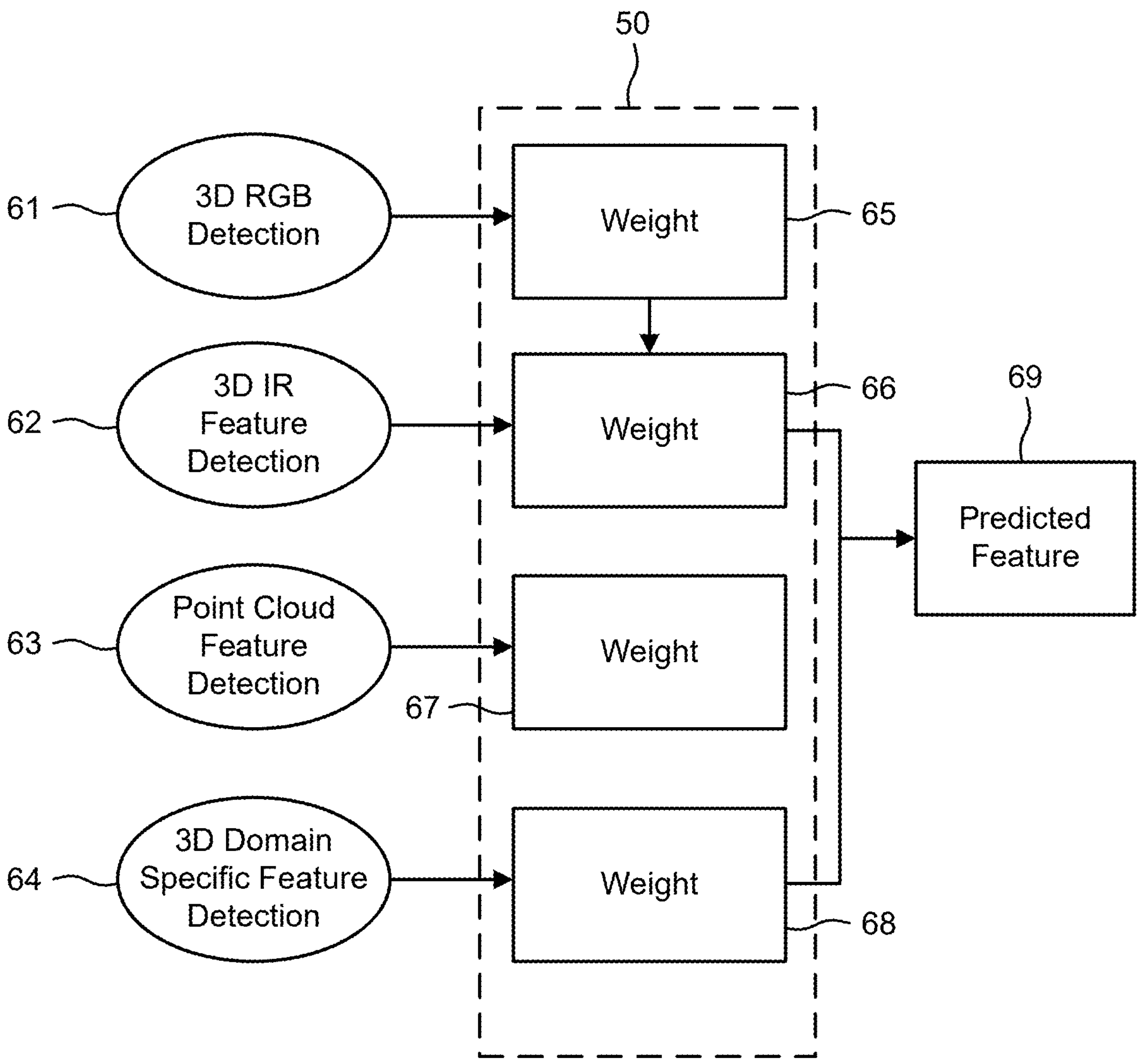
FIG. 6 is an exemplary flow chart for the processing in an ensemble predictor.

The ensemble predictor may use a heuristic weighting algorithm. For example, and with reference to FIG. 6, there is shown an ensemble predictor 50 having from the outputs of the various recognizers projected into 3D spatial coordinates. Inputs may include one or more of 3D RGB image detections 61, 3D IR image detections 62, point cloud feature detections 63, and/or 3D domain specific feature detections 64. Each of the inputs may be weighted by weights 65, 66, 67, 68, respectively. The algorithm will then operate on the inputs as adjusted by the respective weights to derive a predicted feature 69 having a probability associated therewith.

Pipeline Domain Specific Recognizers. In accordance with the present disclosure, additional domain specific recognizers may be included. For example, in pipeline scenarios, the ability to detect and map lateral features of a pipeline system may be accomplished by a lateral recognizer. In the case of a lateral recognizer, a deep learning based visual detection model may be used which operates on the detected point cloud outliers outside of a defined area such as an eclipse.

Additionally, or alternatively, a water sag recognizer may be deployed. The water sag recognizer may use LIDAR sensor data such as intensity and image segmentation models for water.

Additionally, or alternatively, a joint offset recognizer may be deployed. In the case of a joint offset recognizer, sensors may detect diameter changes based on point cloud diameter measurements. In this case, a deep learning-based algorithm may be used based on a visual detection model. Alternatively, or additionally, IMU sensors may detect a bump in the pipeline signifying a joint in the pipeline.

Additionally, or alternatively, a root recognizer may be deployed. In the case of a root recognizer, a deep learning-based algorithm may be used on visual sensor data from a camera 22 and/or point cloud data to map the location of roots which may have breached the integrity of the pipeline.

Figure 15:
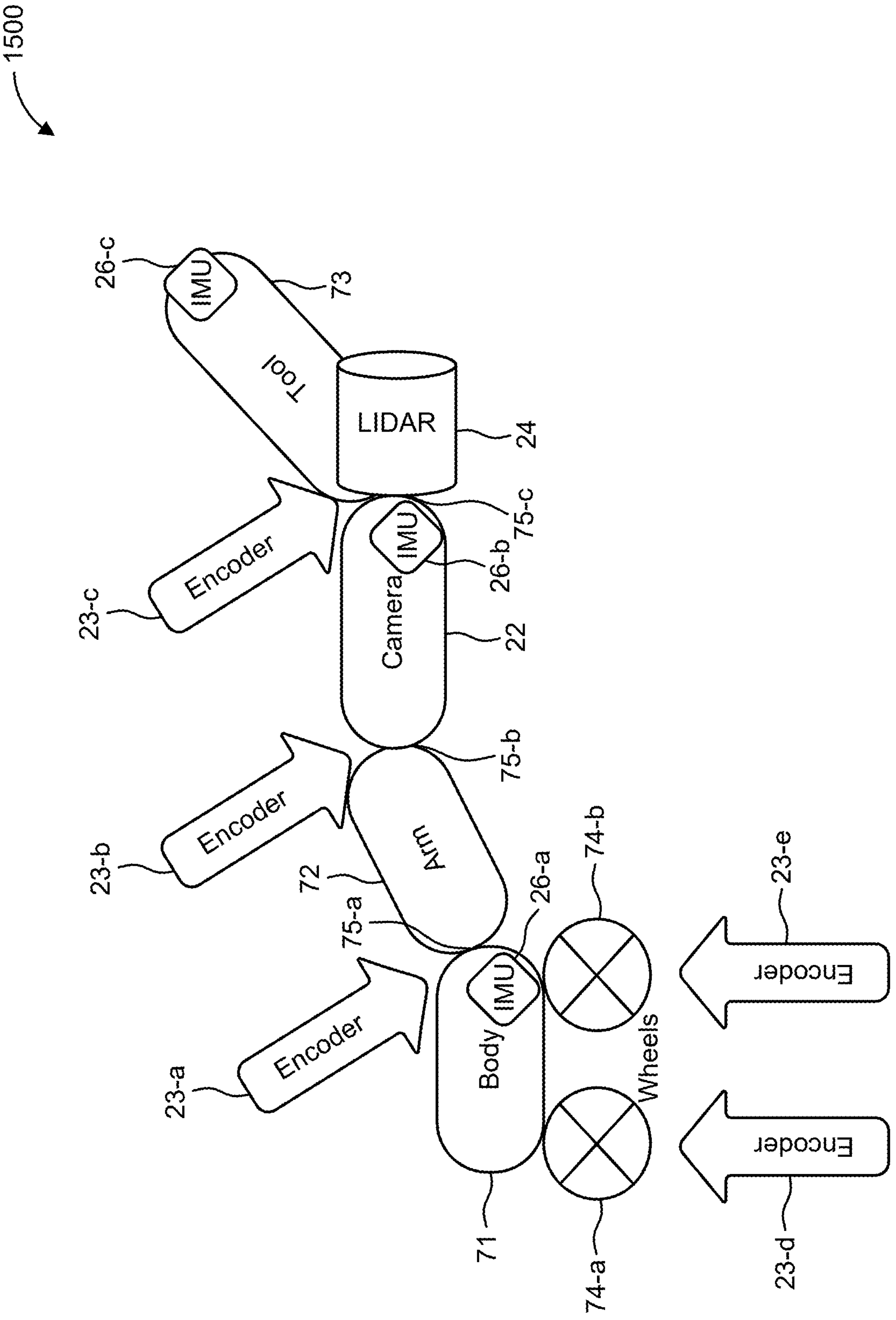
FIG. 15 is an example schematic diagram of a robotic system configured to practice the system and method of the present disclosure.

Robotic System. FIG. 15 is an example robotic system 1500 according to the present disclosure. The robotic system 1500 of FIG. 15 can be an example of the robot shown in FIG. 1 or 2 and can include the processing capabilities discussed with reference to FIG. 3.

The robotic system may include different sensors at different positions on the body 52 and joints of the robotic system. Each of the sensors may perform different measurements, where the different measurements from the various sensors may be will processed, thereby providing useful information. Example information may include distance moved by the robot, absolute position in a given environment, relative position between positions in the environment, orientation of observations within the environment, diameter or other size of the environment (e.g., a pipeline environment), or a combination thereof. This collection of measurements, processing of measurements, and generating of information will be described in more detail below.

The robotic system 1500 can include a variety of hardware and associated sensors for collecting signals and measurements for further processing and analysis. For example, the robotic system 1500 may include a body 71, an arm 72, a camera 22, a LIDAR camera 24, a tool 73, and a set of wheels 74-*a* and 74-*b*. A joint may be defined between respective adjacent components of the robotic system 1500. For example, a joint 75-*a* may be defined between the body 71 and the arm 72; a joint 75-*b* may be defined between the arm 72 and the camera 22; and a joint 75-*c* may be defined between the camera 22 and the tool 73. Each respective joint may include a motor (not shown), which may be configurable to actuate a component of the robotic system 1500 with respect to an adjacent component defining the joint. For example, a motor may be disposed at the joint 75-*a*, which may actuate the arm 72 with respect to the body 71. A motor may be disposed at the joint 75-*b*, which may actuate the camera 22 with respect to the arm 72. A motor may be disposed at the joint 75-*c*, which may actuate the tool 73 and/or the LIDAR camera 24 with respect to the camera 22. In some cases, the actuation may be a rotation or pivot, where the corresponding adjacent component acts as a pivot point for the actuation.

The robotic system 1500 may include one or more motor encoders 23. Encoders may measure the rotation of a motor spindle for a motor of a joint 75 and record the rotation change via electrical signal. For example, encoder 23-*a* may record measurements of movement of the motor disposed in the joint 75-*a*, encoder 23-*b* may record measurements of movement of the motor disposed in the joint 75-*b*, and encoder 23-*c* may record measurements of movement of the motor disposed in the joint 75-*c*. These recordings may result in a count of electrical pulses that correlates to the relative rotation. Each motor-encoder pair may include different gear ratios to determine the absolute rotation angle according to the encoder counts. These configurations may be based upon the mechanical properties, calibration and testing results as well as any runtime feedback provided in the system.

In some cases, encoders may be located at or near each wheel to record the rotation of a respective wheel. For example, the robotic system 1500 may include a pair of wheels 66-*a* and 66-*b*. Each wheel 74-*a* and 74-*b* may include an associated encoder 23-*d* and 23-*e*. An encoder corresponding to a wheel may record linear movement, such as forwards or backwards. As an example, the encoder measurements may determine if the robot is conducting a turn if one wheel is determined to be moving and another wheel is determined not to be moving. In some cases, joints corresponding to a robot head, a robot arm, a robot camera, and/or a robot tool, may each include a corresponding encoder. The encoders may measure rotation of the respective joint.

The robotic system may also include a number of IMUs 26 disposed at various locations along the system. For example, the body 71 may include an IMU 26-*a*, the camera 22 may include an IMU 26-*b*, and the tool 73 may include an IMU 26-*c*. An IMU may be disposed within or on the robot, where the IMU may provide acceleration readings and/or orientation readings. These readings may be made available over a CAN bus. The measurements taken from the IMU(s) may in some cases used for generating and updating frames of reference for the robotic system 1500, which are described in more detail below. For example, the measurements collected by the IMU associated with the body 71, IMU 26-*a* may form the origin for the Scan Frame of Reference. Measurements collected by the IMU associated with the camera 22, IMU 26-*b* may be the origin of the Sensor Frame of Reference. Measurements collected by the IMU associated with the tool 73, IMU 26-*c* may be used by the system to identify or determine the relative orientation of the tool in relation to the camera and body.

Frames of Reference. The robotic system 1500 may generate, monitor, and update various frames of reference data for the robotic system 1500. The measurements collected by the encoders 23 and the IMUs 26 can be processed to form the frames of reference data. The frames of reference data can be used in conjunction with the data collected from other sensors of the robotic system (e.g., application sensors 21, cameras 22, LIDAR camera 24, and the like) to form 3D spatial representations, such as 3D projections 46 and 47 of FIG. 3. Example frame of reference data is provided below.

Global Frame of Reference: The global frame of reference may uniquely identify the position and movement in relation to an overarching environment, such as the earth or region of the earth. The global frame of reference data can include data such as: latitude values, longitude values, direction or orientation values such as degrees in north/south and east/west, rotation values such as 0° (up/normal out from center of earth), 90° (right), 180° (down/pointing to center of the earth), 270° (left), and the like.

Scan Frame of Reference: The scan frame of reference may be absolute data within a given environment, such as a pipeline, but relative to the location of the given environment in the global frame of reference. In some cases, output data and reports can be provided in the Scan Frame of Reference. Scan frame of reference data can include 0 (e.g., distance is the start of the pipe from an access point). The +distance can be measured in, e.g., +Z direction). In the example where the given environment is a pipeline, the +Z can be down the pipe, level to the earth level (e.g., no inclination). The +X can be vertical (12 o'clock=) 0°. The +Y can be horizontal to the right (3 o'clock=) 90°. The +X and +Y can be mapped orthogonal to +Z. In some cases, rotation data can be referenced in the clockwise direction. So, for example, 12 o'clock can be 0°, which can be the +X axis, 3 o'clock can be 90°, which can be the +Y axis, 6 o'clock can be 180°, and 9 o'clock can be 270°.

Robot Body Frame of Reference: The robot body frame of reference can be a relative frame of reference to the body of the robot (e.g., body 71 of FIG. 15). The robot body frame of reference may be managed by IMU 26-*a* of the robot. This data may mitigate the possibility of tipping the robot over are causing the robot to become stuck, such as if auto cut and/or automated for the robot are implemented. For the robot body frame of reference, +Z may be straight ahead. +X may be straight up. +Y may be straight right. +X and +Y may be mapped orthogonal to +Z. In some cases, the rotation data can be referenced in the clockwise direction. For example, 12 o'clock can be 0°, which can be the +X axis, 3 o'clock can be 90°, which can be the +Y axis, 6 o'clock can be 180°, and 9 o'clock can be 270°.

Sensor Frame of Reference: The sensor frame of reference may be a relative frame of reference of the sensor platform. The sensor platform may pan, tilt, and rotate relative to the robot body frame of reference. Sensor data may be transformed into the scan frame of reference to perform calculations. For the sensor frame of reference, +Z may be straight ahead. A 0 distance may be the start of the data gathering and/or after calibrations. A +distance may be in the +Z direction. +X may be straight up. +Y may be straight right. +X and +Y may be mapped orthogonal to +Z. In some cases, the rotation data can be referenced in the clockwise direction. For example, 12 o'clock can be 0°, which can be the +X axis, 3 o'clock can be 90°, which can be the +Y axis, 6 o'clock can be 180°, and 9 o'clock can be 270°.

Figure 16A:
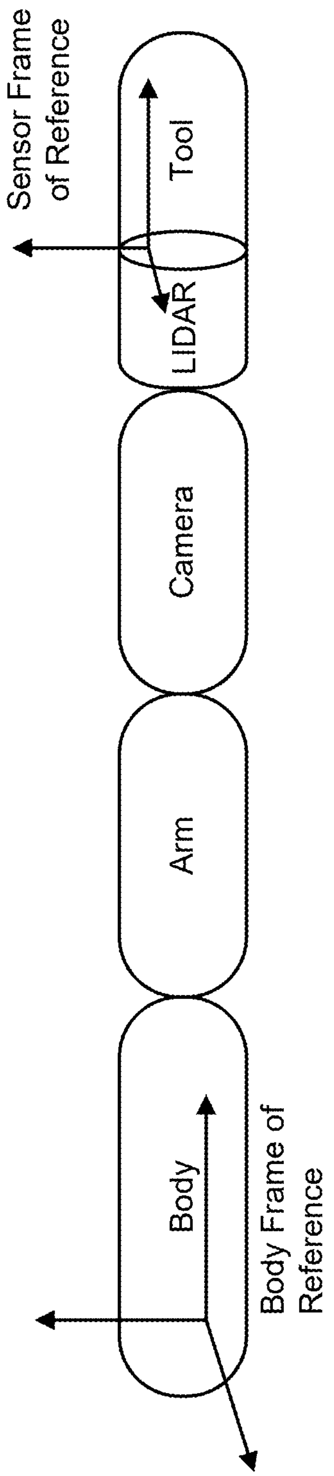
FIGS. 16A and 16B are exemplary illustrations of a robotic system configured to practice the system and method of the present disclosure.
Figure 16B:
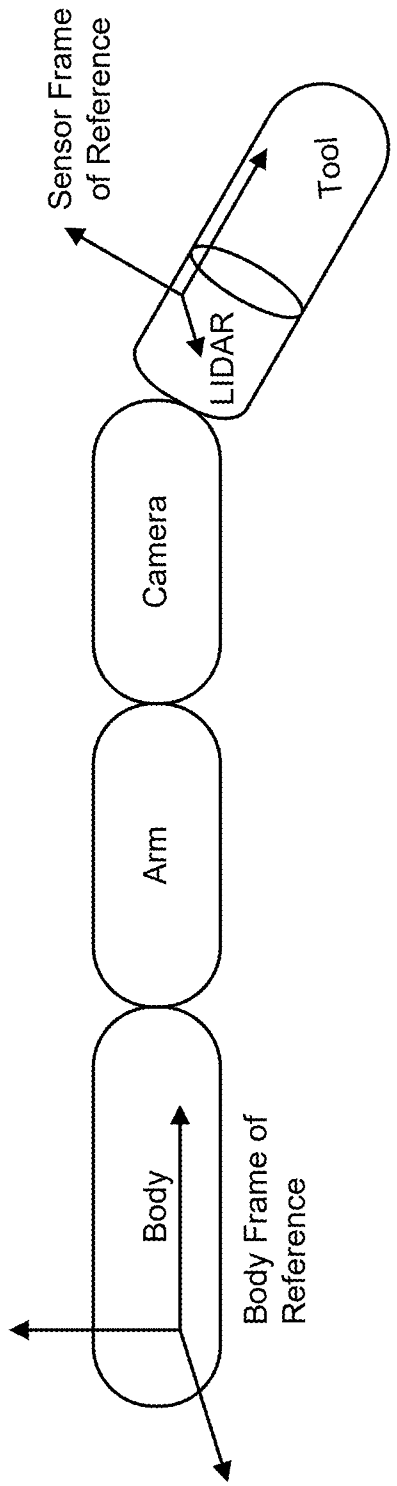

FIGS. 16A and 16B are photographs of a robotic system according to the present disclosure, which may be an example of robotic system 1500 of FIG. 15. The axes overlaying the photographs correspond to the different frames of references discussed above. FIGS. 7A and 7B show locations for where different frames of reference originate from. For example, the robotic system may include a body frame of reference 1605, which may be positioned approximate to the body of the robotic system (e.g., body 71 of FIG. 15). The robotic system may also include a sensor frame of reference 1610, which may be positioned at or in another component of the robotic system. For example, the sensor frame of reference 710 may be positioned approximate to the camera 22, the LIDAR camera 24, the tool 73, and the like.

Figure 17:
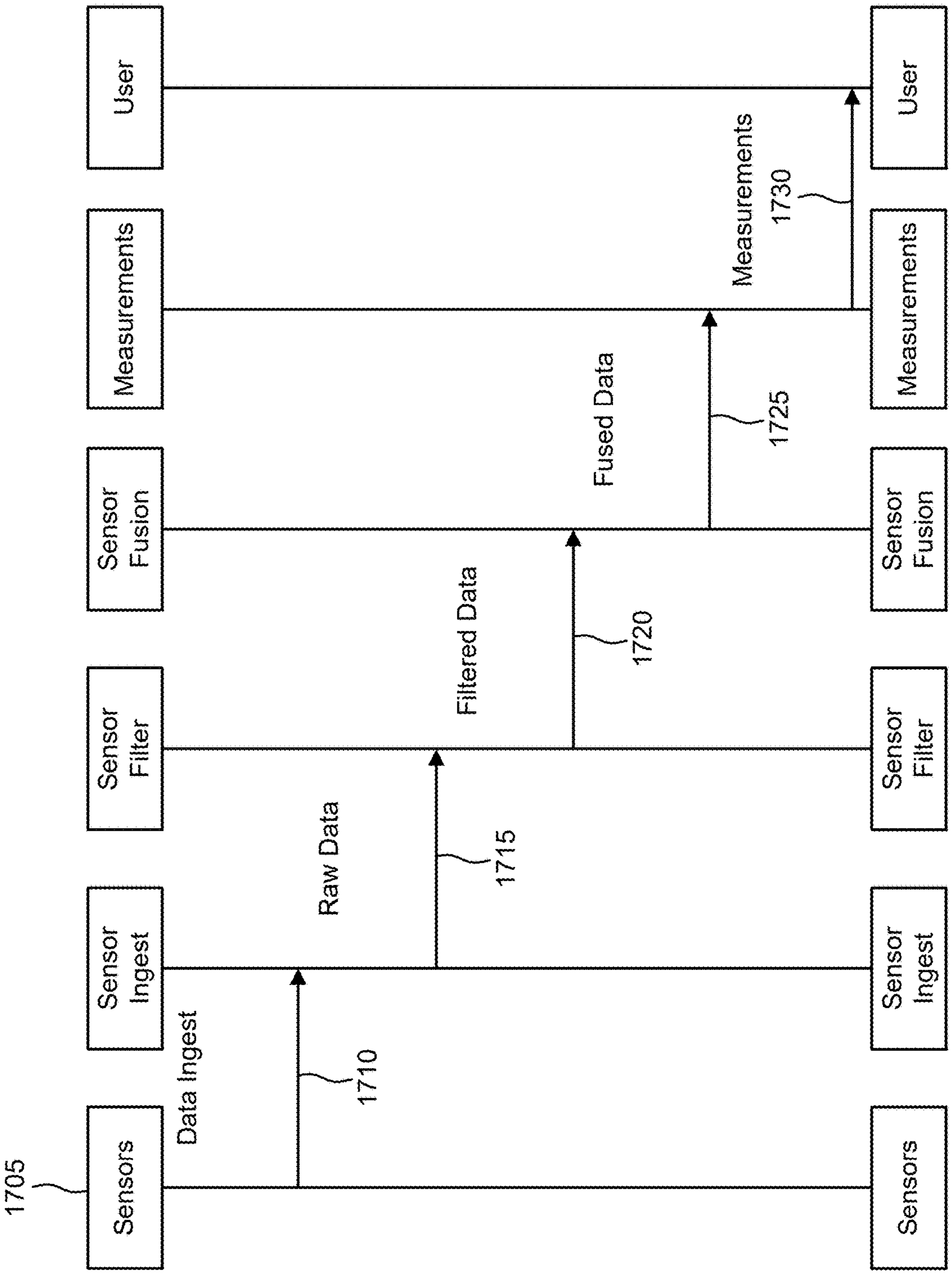
FIG. 17 is an example workflow for collecting and processing measurements by sensors of a robotic system of the present disclosure.
Figure 18:
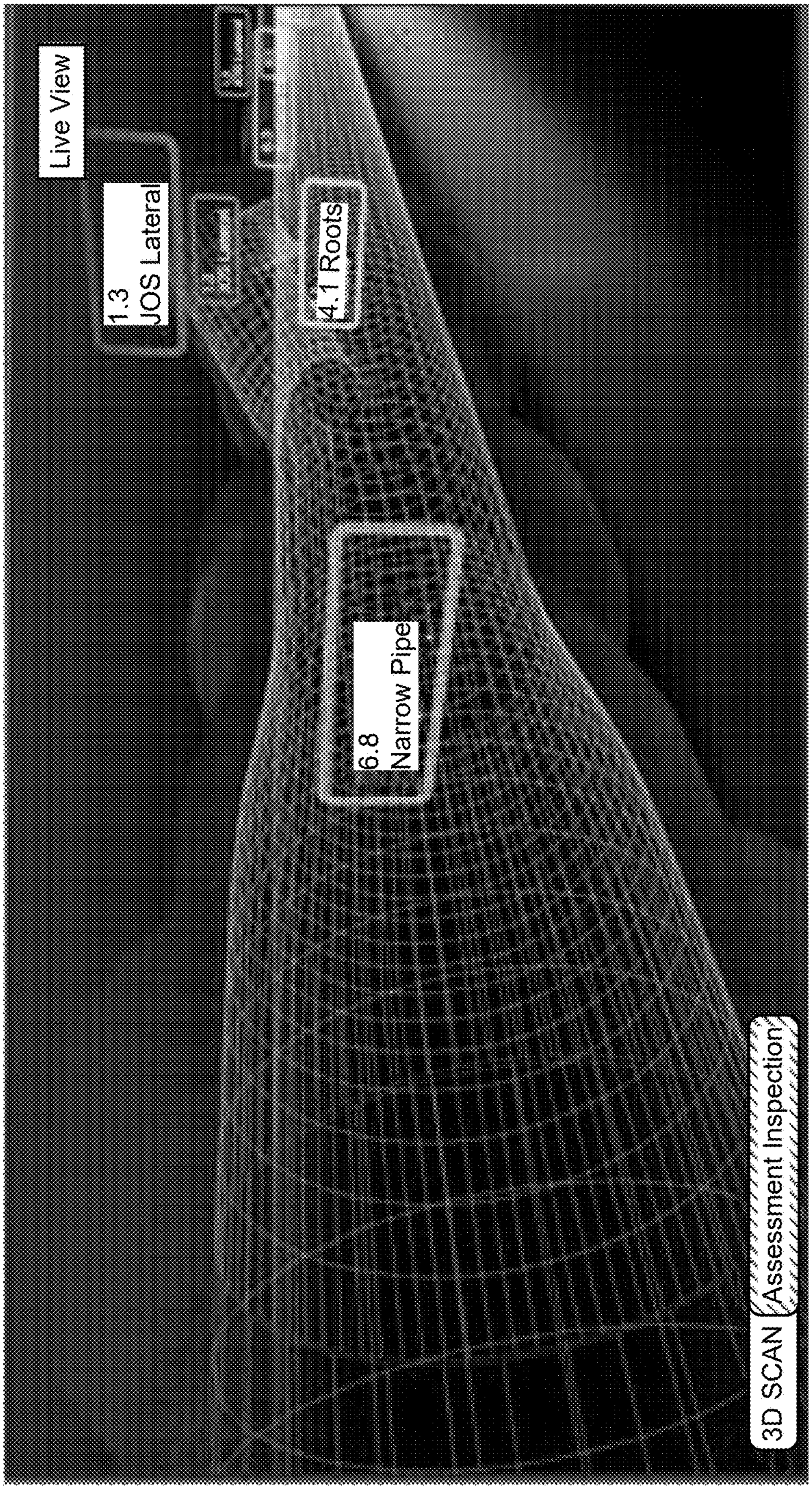
FIG. 18 is an example schematic diagram of a pipeline measured by the robotic system of the present disclosure.
Figure 19:
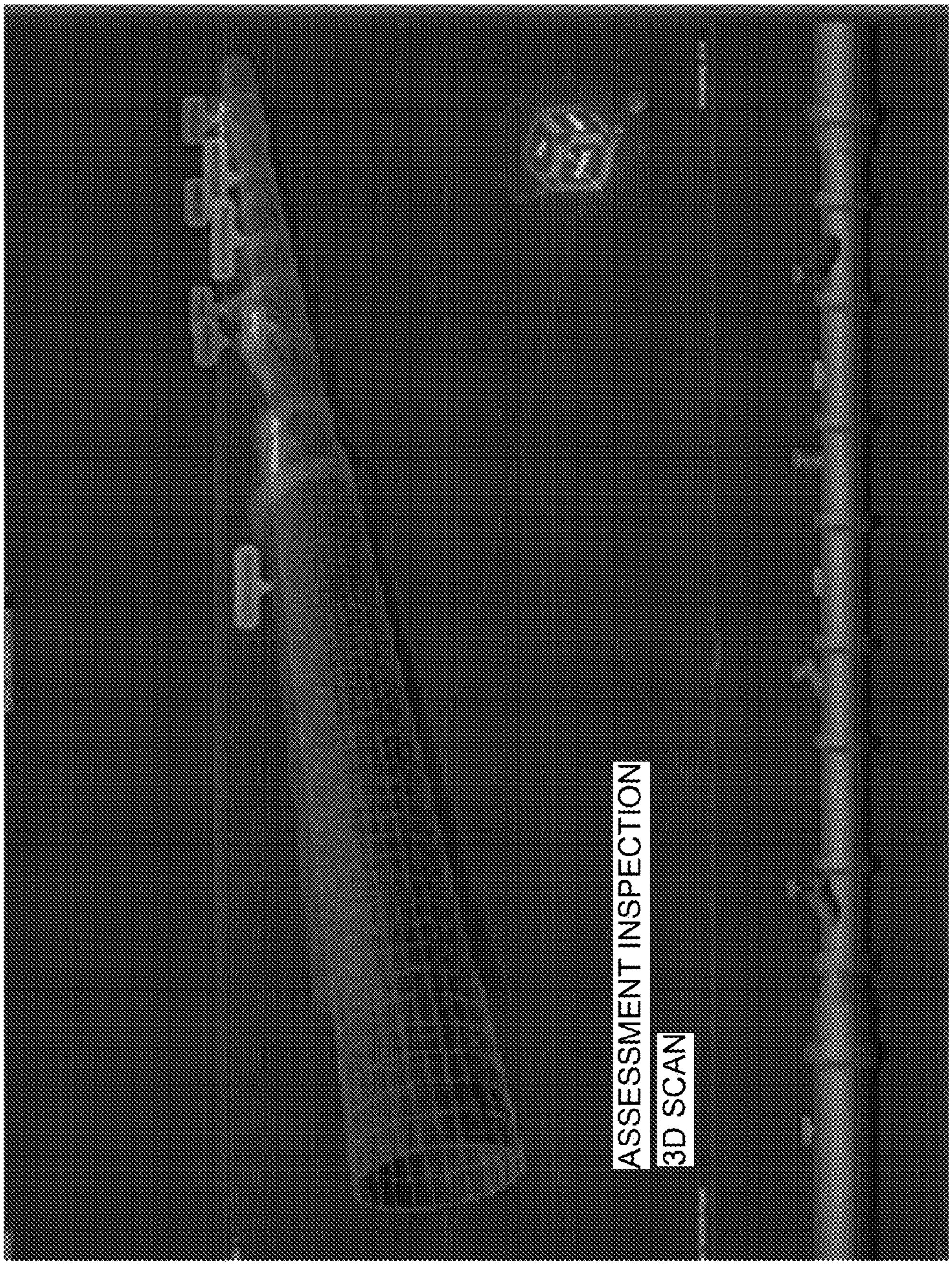
FIG. 19 is another example schematic diagram of a pipeline measured by the robotic system of the present disclosure.

Workflow. FIG. 17 shows an example workflow for implementing the systems and methods described herein. The workflow can be performed by the robotic system described with reference to FIG. 15, and may be implemented separate from, or in conjunction with, the process described with reference to FIG. 3. At 1705, sensors of the robotic system can collect sensor measurements, for example, based on instructions or commands received (e.g., from a user), or according to a predefined schedule or trigger. The sensor measurements may be collected by the IMUs and/or encoders as discussed with reference to FIG. 15. At 1710, the sensor measurements can be ingested or sent to sensor ingest. The sensor ingest can be, for example, a sensor driver or processor, which may convert signals received from the sensor into a compatible format for downstream processing (e.g., binary or numerical values, etc.). At 1715, the raw data may be sent to sensor filters, which may filter the raw data. Filtering of the data may include identifying and removing noisy readings, identifying and removing communication errors, and the like. At 1720, the filtered data can be sent to sensor fusion, which may combine and further process the filtered data. At 1725, the fused data may be sent to measurement logic, which may further process or convert the fused data into measurement data. At 1730, the measurement data may be sent to a user, such as via a display external to the robot.

Figure 23:
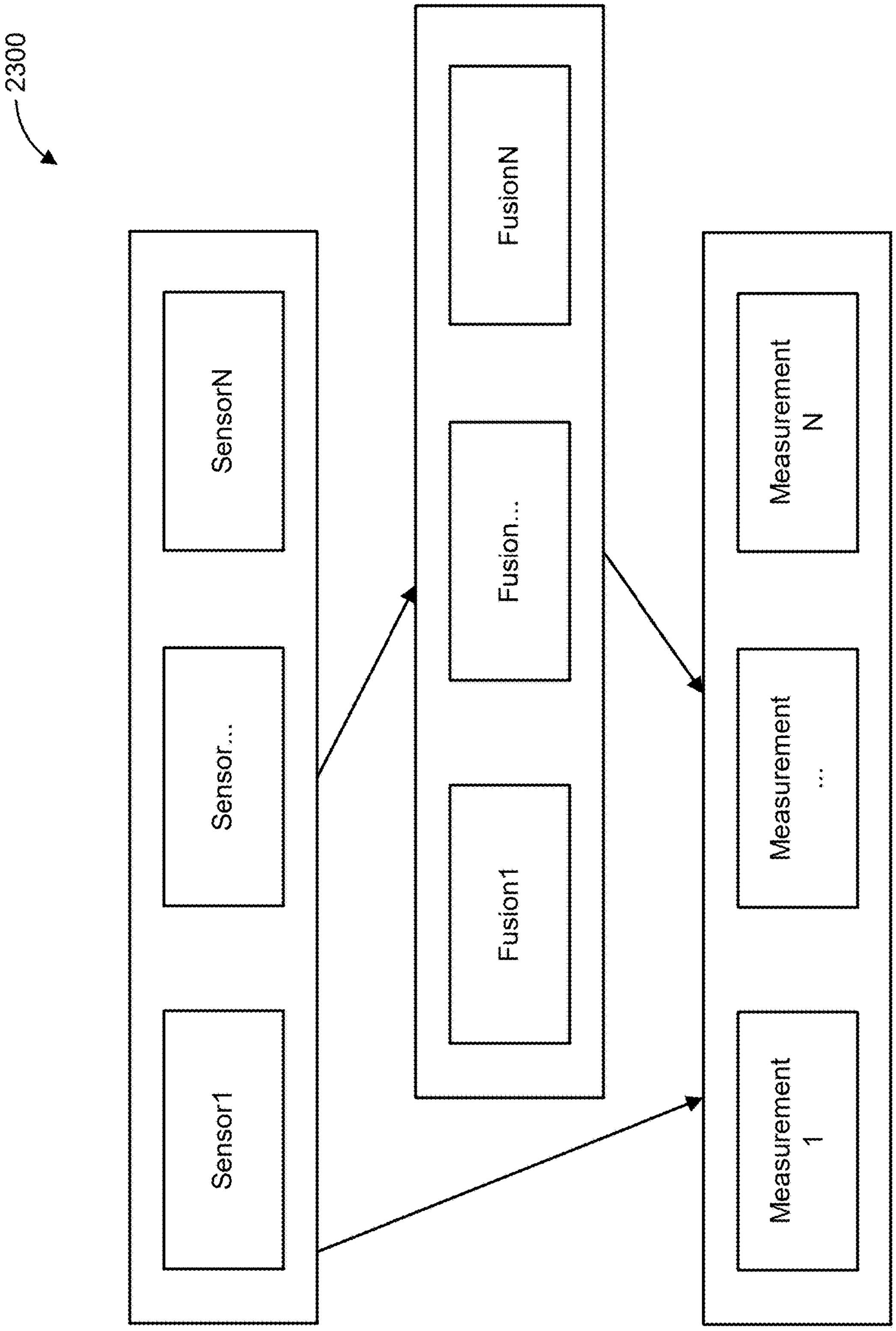
FIG. 23 is an exemplary flow chart for generating measurement data for the robotic system.
Figure 24:
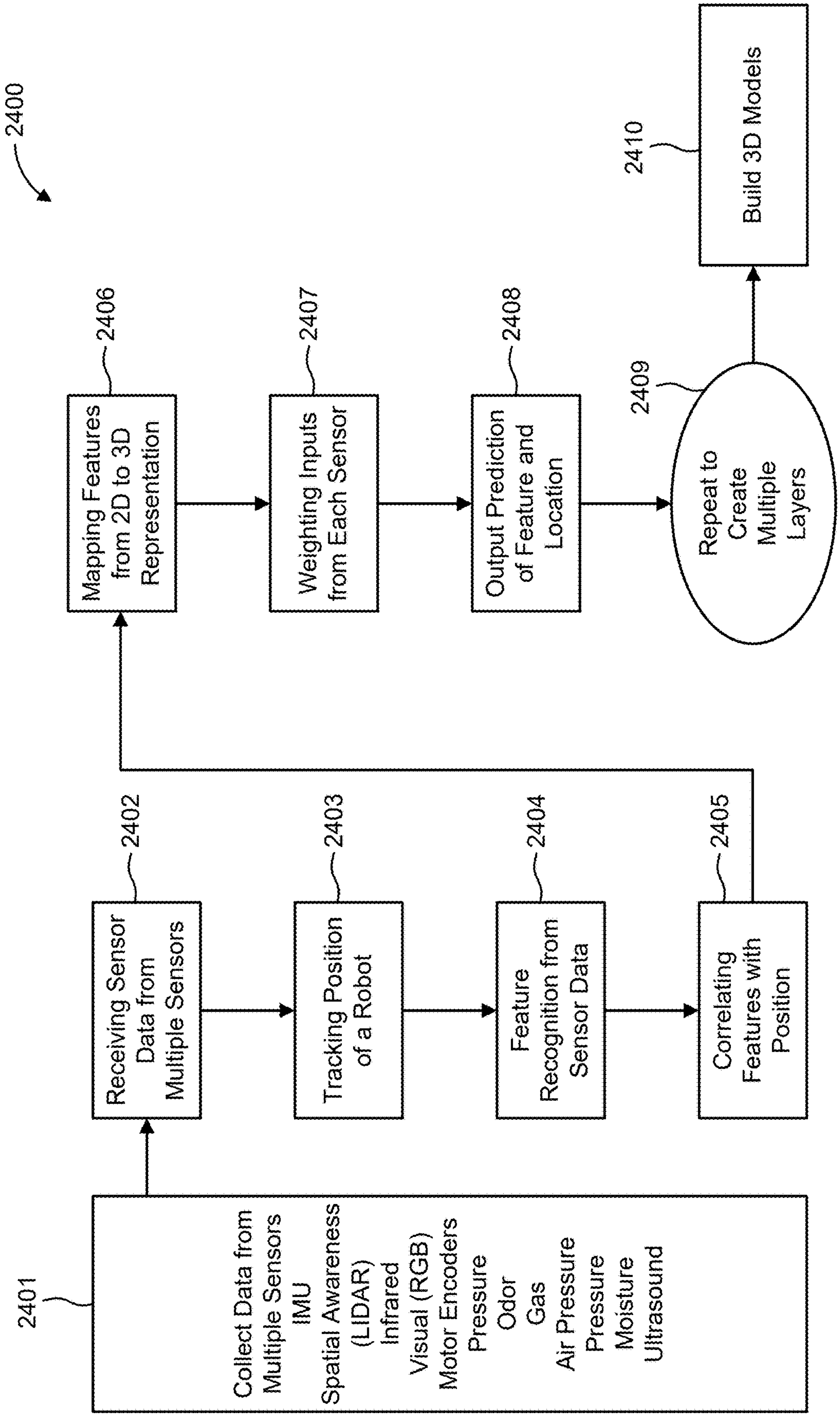
FIG. 24 is an exemplary flow chart for generating a 3D image from a multiple sensor configuration.

Another example process 2300 is shown in FIG. 23. Sensor data, such as from IMU(s), encoder(s), LIDAR, cameras, and the like, may be collected. For fusion, the robotic system may be aggregating or compiling sensor data, which can include sensor data from the same type of sensors, or from different types of sensors. For example, sensor data from an IMU and sensor data from LIDAR may be combined or aggregated. In some cases, sensor data from different sensors may be compared, such as encoder sensor data compared to angle data measure by an IMU(s). Measurement data may be sensor data, fusion data, or both, that is further processed into information corresponding to the robotic system or the environment of the robotic system. For example, the sensor data and/or the fusion data may be processed and converted or generated into distance travelled by the robotic system, orientation and position of the robotic system, frame of reference data for the robotic system, a pipe diameter which the robotic system is in, and the like. This measurement data can then be stored for future processing or use by the robotic system.

Weights Each of the sensors may have some weighted value to determine the typical amount of contribution to each measurement. The weighted value may be set based on the calibration and testing of the different components, as well as the mechanical design of the robotic system to account for which positions may give more trustworthy or viable readings. The weights for any sensor may be dynamically adjusted based upon a feedback loop. The feedback may come from other fused measurements, or directly from the detected noise or errors on the communication channel. If weighted values are decreased the diagnostics information may be logged and reported so the users may know that there may be a pending failure or decreased accuracy in the system.

Acceleration. As an IMU is moved, an IMU may detect acceleration in the XYZ directions. The integration (e.g., calculation) of acceleration may provide the velocity (speed and direction) of the respective movement. The integration of the velocity may result in the relative distance movement in the corresponding direction.

As the IMUs provide acceleration readings directly and the robotic system can monitor a given time period (e.g., 'timestamp_ns') the speed and distance travelled may be calculated by multiplying by the time period. The time may be monitored by different components of the robotic system. For example, the processor/memory 12 of the robotic system shown in FIG. 2 may include a clock, which may monitor a time or time period, and may provide timestamps corresponding to measurements or reading collected from a sensor. In other cases, a processor external to the robotic system may track the time or time periods associated with the measurements or readings. Example calculations are provided below.

```
uint64_t time_delta = timestamp_ns − previous_timestamp_ns
float speed = acceleration * time_delta
float distance = speed * time_delta
```

In some cases, the IMU distance calculations may experience drift, which may be an accumulation of errors and noise. If left uncorrected, drift may result in significant variation relative to the ground truth position. As discussed above, the system may take into account drift values and adjust measurement values as necessary.

In some cases, the robotic system may rely on a single or subset of the IMUs to collect and process acceleration measurements. For example, the robotic system may process acceleration data from the IMU 26-*a*, the IMU 26-*b*, or the IMU 26-*c* to calculate distance travelled, velocity of the robotic system, frame of reference data, and the like, where the acceleration data from the selected IMU is taken to represent the robotic system. In some cases, measurements and calculations of acceleration data collected by a respective IMU may be compared to other acceleration data from another respective IMU, which may be an example of verifying acceleration measurements of a particular IMU. In some cases, acceleration data of multiple IMUs can be collected and aggregated for processing. For example, acceleration data from two or more of the IMUs 26-*a*-*c* may be aggregated, compiled, and the like, prior to further processing (e.g., which may be an example of Step 1725 of FIG. 17).

Orientation. The IMUs may also record euler angles and gyroscopic readings to report the relative orientation of the IMU. The orientation for each IMU may be relative to the respective joint and body segments. The angles may be measured relative to one of 3 axes of rotation. Taken together, the measured angles may fully describe the orientation of the IMU and thus the hardware of the robotic system.

Measurements. Distance or position measurements may be a collection of various readings including measurements of the wheel encoders; measurements of the IMU(s); measurements of a Visual SLAM; measurements of a LIDAR SLAM, or a combination thereof. The distance, velocity, position, and the like, may be calculated once the sensors begin taking measurements. In some cases, the distance, velocity, position data may be zeroed out (e.g., upon user request), which can facilitate recalibration of the location reference to some known location. Each input sensor may include a configurable weight based upon calibration and testing.

The measurements collected and process from the IMUs and/or encoders can be used to generate and update the frames of reference of data. For example, the frames of reference can be associated with a particular hardware component of the robotic system, or a particular sensor of the robotic system. Likewise, a particular IMU and/or encoder may be associated with the particular frame of reference. For example, the body frame of reference may originate at a location approximate to the body 71 of the robotic system. Likewise, the IMU 26-*a* may be disposed in or near the body 71. Measurements from the IMU 26-*a* may be collected and processed, in part, to update the body frame of reference data maintained by the robotic system. Continuing the example, the encoder 23-*a* may be positioned approximate to the body 71, and measurements from the encoder 23-*a* may be collected and processed to update the body frame of reference data.

In some cases, the measurements from the IMU and/or encoders may be collected and processed to identify errors or issues with the robotic system. The IMU and/or encoder measurements may be collected and compared to each other to identify divergences from normal activity. For example, a particular IMU or encoder measurements may be compared to measurements of another IMU or encoder of the robotic system (e.g., over the same time period). An abnormality of the robotic system may be detected from this comparison. For example, if one set of measurements are indicating that the robotic system is experiencing movement that is inconsistent with another set of measurements from another IMU or encoder, the robotic system may determine either a malfunction in a particular sensor or abnormal movement of the robotic system.

For example, the robotic system may detect wheel slippage based on encoder measurements (e.g., from encoders 23-*d* and 23-*e*). For example, if the encoders measurements are changing, but the IMU or other sensors are reporting no change in the position of the robotic system, then the system may determine that the wheel(s) are slipping (e.g., measured distance should not increment if the position is not changing).

In another example, the robotic system may detect drift in IMU measurements. For example, if a particular IMU is reporting a change in distance, but the encoders or other sensors are not reporting movement, then the robotic system may determine that a drift effect is occurring with respect to an IMU. The robotic system, in response, may adjust the absolute position of the IMU and provide feedback to compensate drift and adjust future readings.

In another example, the robotic system may detect a change, or lack thereof, relating to the surrounding environment of the robotic system. For example, with respect to FIG. 15, in some cases the tool 73 may be a cutting tool. The tool 73 may be directed to cut a particular segment of a pipe (e.g., where the surrounding environment is a pipeline). The motor disposed in the joint 75-*c* may be instructed to actuate the tool 73 towards a particular segment of pipe. As the tool 73 performs a cutting of the pipe segment, the IMU 26-*c* and/or the encoder 23-*c* may collect measurements that indicate no or minimal movement of the tool 73. As the tool begins to cut through the pipe, the distal end of the tool may begin to pass through the pipe segment, which the IMU 26-*c* and/or the encoder 23-*c* may detect via collected measurements. Thus, the IMU/encoder measurements may indicate that the tool 73 is successfully cutting through the pipe segment.

3D Point Measurements. The 3D points may intake sensor measurements, such as LIDAR readings from LIDAR camera 24, and then perform rotation and translation calculations to map the Sensor Frame of Reference for the LIDAR into the Scan Frame of Reference. Measurements from other IMU or encoders can also be taken into account for mapping the scan frame of reference. For example, the calculations may take into account the body IMU 26-*a* (e.g., for relative inclination of the pipeline), the encoder and IMU readings for each joint 75 to determine the relative orientation of the LIDAR 24 to the body 71, and distance within the Scan Frame of Reference.

Multiple readings of the same location may be measured from different perspectives. This may be performed with multiple readings from independent sensors, or from changing the orientation and position of the single sensor within the Scan Frame of Reference. The different perspective readings may be combined to account for noise such as reflectance and absorption. The multiple readings may also serve to create a denser point cloud 34 of FIG. 3.

It should be noted that the Sensor Frame of Reference may vary based on position and orientation and other factors. However, the software and processing map this variation onto a common Scan Frame of Reference so that the various sensor readings and subsequent calculations merge appropriately. In a way, the frames of reference enable the building of highly accurate 3D map because there is a common point associated with each frame.

In some cases, the 3D points may be sparse and may not always have a complete measurement of the axial readings of the pipeline. In those cases, the readings may be interpolated from the nearest neighbor readings. The sparse readings may trigger the robotic system to rescan through a specific area to create a denser set of points to perform a more precise measurement.

An example calculation resulting from the 3D point measurements may be the diameter of the pipeline, when the environment of the robotic system is a pipeline. Diameter may be defined as the distance between the opposite sides of the pipe when measured at the vertical axis (e.g., 12 o'clock-6 o'clock) going through the center of the pipe. If the pipe is not round, then measurement reporting may include the horizontal axis (e.g., 3 o'clock-9 O'clock) as well.

The robotic system may also be capable of detecting voids in the environment (e.g., a pipeline) from the 3D point measurements. For example, when there is a detected void in the axial readings this may be the location of adjoining services in the pipeline. LIDAR readings of the robotic system may depend on reflected signals, and thus there may not be any readings directly on the connecting service. Instead, the readings along the inside wall of the service may show an increasing radial distance. The void in the middle of these readings may be determined to be the diameter of the service. FIG. 9 shows a schematic diagram of a pipeline, which may be measured by the robotic system described herein.

Figure 21:
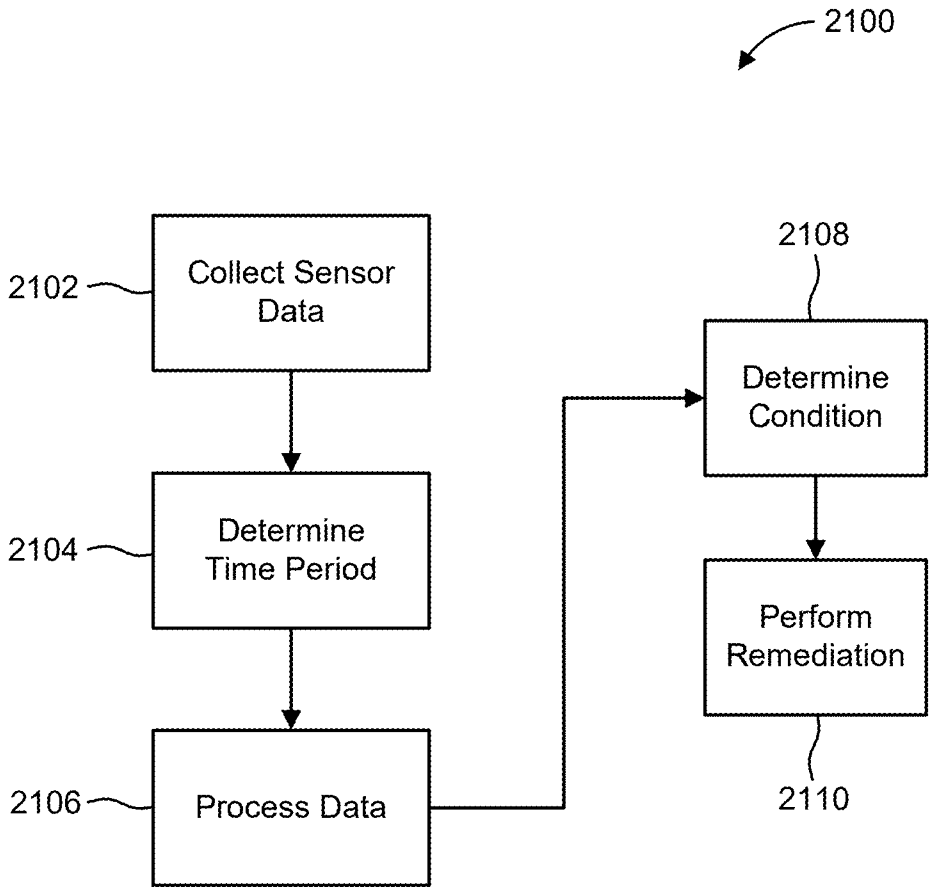
FIG. 21 is an exemplary flow chart for detecting a condition of the robotic system.

An exemplary flow diagram 2100 of a detecting a condition of the robotic system is shown in FIG. 21. At 2102, sensor data may be collected. The sensor data may be data received from an IMU and/or encoder of the robotic system. Further, the sensor data may in some cases be collected from two or more sensors. For example, a first set of data can be collected by a particular IMU or encoder, and a second set of data can be collected by a different IMU or encoder. At 2104, the robotic system can determine time periods for the data collected. For example, time stamps can be associated with the data or data sets, to determine at which time the sensor data is collected. At 2106, the collected data may be processed. For example, a data set from one sensor can identify the robotic system, or a part of the robotic system, is in motion at a given time. Another data set can identify the robotic system, or a part of the robotic system, is in a different motion or no motion at a given time. At 2108, the robotic system can determine a condition is present based on the data processing. For example, the robotic system can determine the robotic system is experiencing abnormal movement, a tool of the robotic system has accomplished a task, wheel slippage, drift in a dataset, and the like. At 2110, the robotic system may perform a remediation task. For example, the robotic system may apply different motor instructions for a particular wheel, a particular body part, warning notice to a user of the robotic system, and the like.

Figure 22:
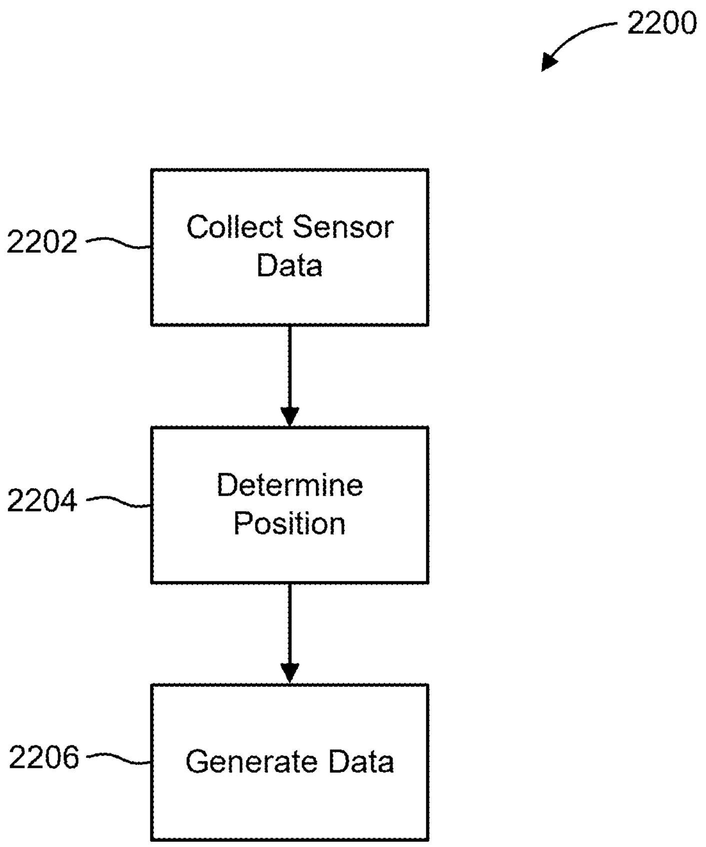
FIG. 22 is an exemplary flow chart for generating reference frame data for the robotic system.

An exemplary flow diagram 2200 for generating reference frame data of the robotic system is shown in FIG. 22. At 2202, sensor data may be collected. The sensor data may be data received from an IMU and/or encoder of the robotic system. Further, the sensor data may in some cases be collected from two or more sensors. For example, a first set of data can be collected by a particular IMU or encoder, and a second set of data can be collected by a different IMU or encoder. At 2204, the robotic system may determine a current position and orientation of the robotic system, or a portion of the robotic system, based on the collected sensor data. For example, collected sensor data may be collected by a particular IMU or encoder, which may be associated with a respective portion of the robotic system (e.g., tool, body, arm, and the like). Position and orientation data may be derived from processing the collected sensor data, where sensor data may be in the form of changes in acceleration and/or changes in gyroscopic measurements. At 2206, frame of reference data may be generated based on the determined positions and orientations. For example, the robotic system may maintain one or more frame of references. The frame of references may be associated with particular regions or parts of the robotic system. In some cases, generating frame of reference data may include updating frame of reference data maintained by the robotic system. In some cases, the frame of reference data maintained by the robotic system may be updated according to the position and orientation data processed from the collected sensor data. For example, the position data may indicate a change in the X, Y, or Z direction of a frame of reference, and the orientation data may indicate a change in degrees from center of a predefined axis (e.g., 5 degrees, 20 degrees, and the like). The frame of reference data may be updated to reflect the change in position and orientation data.

Lining Scans. In an exemplary use case, the robotic system may determine features after interior lining of a pipe or other enclosed surface. In such a case, a lining process may cover features with a material that repairs and or seals off damages to the pipeline. Features such as cracks may longer be visible, however, lateral joints may also not be visible.

The robotic system may create a digital map as described in detail above based on a scan before the lining material is inserted. For each feature, the information recorded will include the relative cartesian coordinates (XYZ) and spherical (angle+distance) and all other position information of the feature in the scan frame of reference. Each feature information may be stored along with the still images and video feeds as well as any additional information about the location that is added by the AI detection algorithms, image segmentation, or manual user input. These additional information fields will be used to aid in the location of the feature after the lining is inserted.

After the lining process for rehabilitation of the pipeline the robotic scanning system may relocate the position of the features observed during the pre-lining scan. For example, detection of certain features may be used to observe adequate repairs, while others may need to be located to provide access to lateral intersections in which case a portion of the newly installed liner may need to be removed. As the robot scans through post-lining, the relative position will localize the robot within the map created during the pre-lining scan. The before and after lining will share a common scan frame of reference so the origin for all points are at the same position. The localization will be based upon the plurality of sensors including, for example, the distance moved (+Z), the orientation including pitch, roll, and yaw, and feature detection. Additionally, the robotic system may use some or all of the sensors to perform detections and observations in the post-lining scan similar to what was done in the before lining process.

By using the common scan frame of reference, the detected features before the liner was inserted and after the liner was inserted are correlated as to location and feature description. Differences may be logged and saved for future investigation and processing. For example, the post-liner scan may detect voids in the liner where an air gap, sag or wrinkle in the liner material may not have attached properly.

The localization of the robot within the map may be continuously updated during subsequent scans. This allows the processing to reference previous data observations which may be obscured on secondary scans due to lining or other obstructions. The localization will update based upon the movement of the robot within the environment and using the common origin from the scan frame of reference. The localization may be further optimized to provide adjustments based upon feature detection and position extraction using the sensors during the second scan.

The IR camera feed may detect a void behind the liner by sensing temperature variants which would indicate an intersection with a lateral pipe, in which case the liner may need to be cut. If the after lining scan detects a large amount of water behind the liner that may denote a lot of groundwater is getting into the system. This may impact the quality of the lining process and may require secondary observations.

The IR camera detection may be used for segmentation, edge detection or deep learning-based observations to precisely bound the size, shape and location of the features behind the liner. This can then be used as a cross reference to earlier data before lining including the 3D point cloud, RGB images, and IR images. The cross reference between the before and after lining information may then allow localization to fine tune the position within the scan frame of reference. This may account for adjustments due to drift, slippage or other errors in the coordinate mapping between the scans.

The 3D point cloud from LIDAR sensors may be used to detect or locate an anomaly such as a bulge or sag in the liner which may also indicate the location of a void indicating an access point or lateral. The 3D point cloud may observe significant variations in the diameter and shape of the pipeline due to a wrinkled or gaps detected in the liner. In normal after lining scans the diameter of the pipeline may be slightly smaller, for example, by between ¼"-½" when compared to the before lining diameter. Consistent shapes may indicate a normal liner insertion.

Visual Camera(s) can be used with deep learning and image segmentation to detect the dimple in the liner material at the lateral. The RGB camera is used in the pre-lining to detect features and observations on the unlined pipeline with deep learning and image segmentation and other processing. These same processes can be applied in the after lining process to detect the abnormalities in the liner. A normal after liner RGB image will be very uniform and smooth from the newly placed liner. If there are edges, wrinkles or other visual observations this may be an indication of a feature. This position will be correlated with the before liner data. If this is localized to a feature then we will update the positioning in the localization on the map.

Any time there is an unexpected result between the pre-liner scans and the post-liner scans will be flagged as an anomaly which may require further processing.

Figure 20:
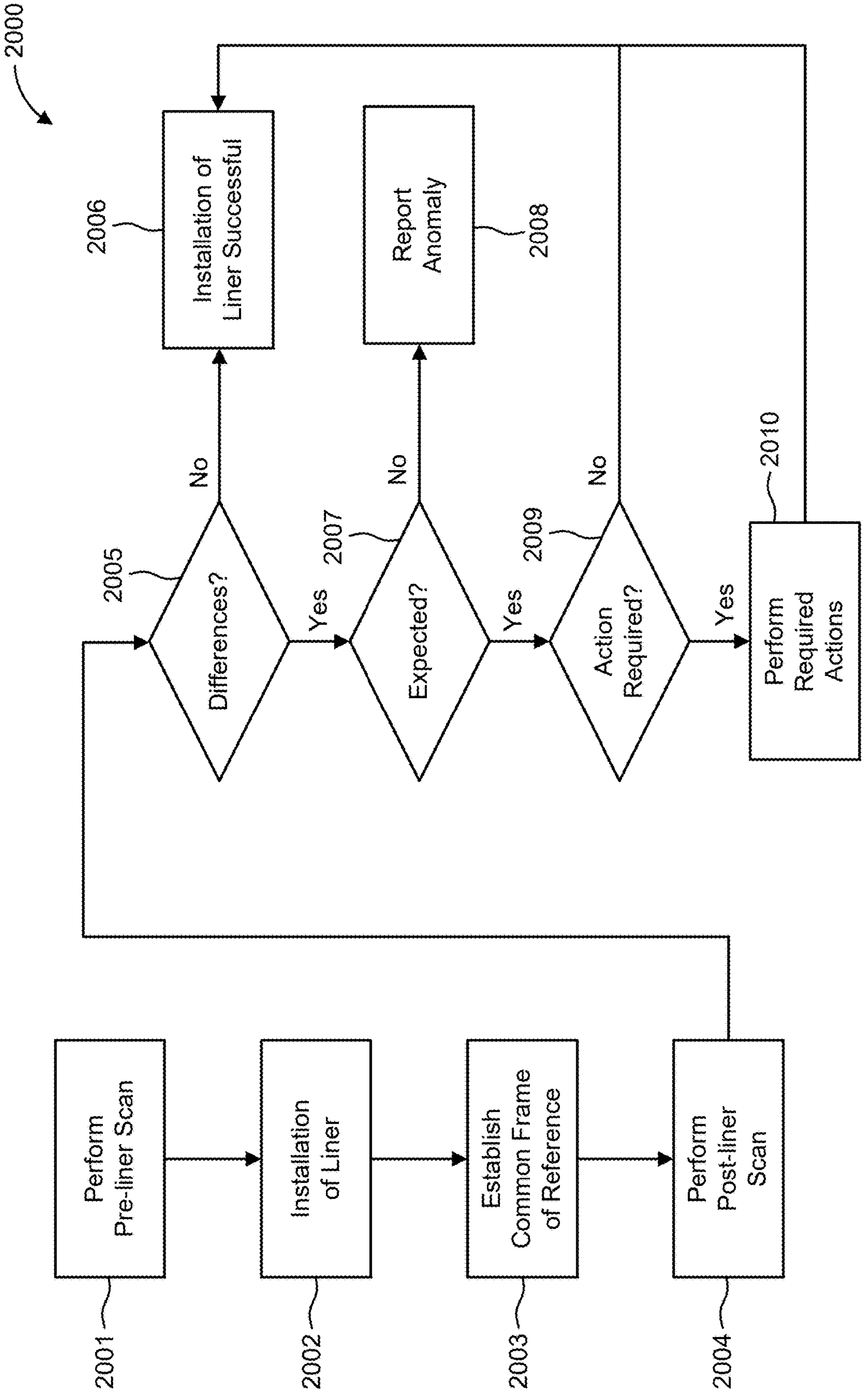
FIG. 20 is an exemplary flow chart showing the scanning processes prior to and after liner insertion into a pipe.

An exemplary flow diagram 2000 of the pre-lining and post-lining comparison scans is shown in FIG. 20. At 2001, the pre-liner scan in accordance with the present disclosure is performed. At 2002, the liner is installed. At 2003, a common frame of reference is established between the pre-liner scan and the post-liner scan. Once that common frame of reference is established, the post-liner scan is performed in accordance with the present disclosure.

At 2005, the pre-liner scan and the post-liner scan are compared to determine if there are any differences. If there are no differences, then the installation of the liner is successful at 2006. This direct step may be rare because there will often be a detectable difference in the circumference of the pipe due to the thickness of the liner. However, for spray in place liners, that difference may be negligible. If there are differences at 2005, the decision 2007 determines whether these differences are expected. For example, differences in which a liner is expected to block access to a lateral is an expected difference. Differences in which creases are detected in the liner may not be an expected difference. If the differences are not expected, an anomaly may be reported at 2008. If the differences are expected, processing continues at 2009 in which it is determined whether action is required. For example, no action is required when the only difference is a slight decrease in diameter. In that case, the installation of the liner is considered successful at 2006. If there is an action that needs to be performed, then that action is performed at 2010 and the installation is considered successful at 2006. Corrective actions may, for example, include cutting an opening to provide access to a lateral. Alternatively, or additionally, a new post-liner scan may be performed after the corrective action is taken.

Systems Implementation. The present disclosure may be implemented with a combination of hardware and software as described above. Software components may include the various algorithms and computational techniques for processing sensor data to extract meaningful information. Advanced techniques such as object detection, feature extraction, data association, odometry estimation, probabilistic modeling and optimization methods.

While examples of a robotic multi-sensor system have been described in connection with various computing devices/processors, the underlying concepts may be applied to any computing device, processor, or system capable of facilitating an artificial intelligence system using multiple sensors. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with the disclosed system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing the processing as described herein. When implemented on a general-purpose processor, the program code combines with the processor to provide a unique device that operates to invoke the functionality of a multi-sensor predictive system.

While the system has been described in connection with the various examples of the various figures, it is to be understood that other similar implementations may be used, or modifications and additions may be made to the described examples of the disclosed system without deviating therefrom. For example, one skilled in the art will recognize that a system as described in the instant application may apply to any environment, whether wired or wireless, with an assortment of sensors, and may also be applied to any number of such robotic devices connected via a communications network and interacting across the network. Therefore, the system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A system comprising:

a plurality of sensors;

a processor; and a memory, wherein the processor is configured to operate on sensor data from the plurality of sensors using artificial intelligence algorithms, and wherein the processor is further configured to:

perform a first scan of an environment using the plurality of sensors associated with a robotic system, wherein the robotic system is placed within the environment and wherein the robotic system has spatial awareness with respect to the environment;

determine a scan frame of reference for each of the plurality of sensors using the spatial awareness of the robotic system and a relative position of each of the plurality of sensors with respect to the robotic system;

detect, using at least one of the plurality of sensors, a feature associated with a location within the environment;

combine the feature in an ensemble predictor, wherein the ensemble predictor predicts an identification of the feature and the location of the feature within the environment;

generating a first map of the environment based on a result of combining the feature in the ensemble predictor;

perform a second scan of the environment and generate a second map of the environment;

compare the first map of the environment to the second map of the environment; and identify and locate differences in detected features between the first map and the second map, wherein the environment is a pipe and a liner is inserted into the pipe after the first scan and prior to the second scan, and wherein the detected feature is a lateral connection of the pipe and the differences predict where the lateral connection is located within the pipe after insertion of the liner.

2. The system of claim 1 wherein the feature is identified using an artificial intelligence algorithm.

3. The system of claim 2 wherein the artificial intelligence algorithm comprises a convolutional neural network (CNN).

4. The system of claim 1 wherein the ensemble predictor combines the detected features using a heuristic weighting algorithm.

5. The system of claim 1 wherein the plurality of sensors comprises one or more of a first sensor type and one or more of a second sensor type and wherein the ensemble predictor is configured to combine sensor data from the first sensor type and the second sensor type.

6. The system of claim 5 wherein the ensemble predictor combines the detected features using a heuristic weighting algorithm.

7. The system of claim 1 wherein the robotic system captures sensor data from the plurality of sensors as it traverses the environment, wherein the sensor data comprises sensor data collected from different locations within the environment.

8. The system of claim 7 wherein the plurality of sensors comprises one or more of a first sensor type and one or more of a second sensor type and wherein the ensemble predictor is configured to combine sensor data from the first sensor type and the second sensor type.

9. The system of claim 8 wherein the ensemble predictor combines the detected features using a heuristic weighting algorithm that is applied as a function of location within the environment and a function of sensor type.

10. The system of claim 7 wherein the processor is further configured to detect a change in a location of the robotic system within the environment or a change in an orientation of the robotic system within the environment and wherein the ensemble predictor combines the detected features using a heuristic weighting algorithm that is applied as a function of the location or the orientation and as a function of sensor type.

11. The system of claim 1 wherein the spatial awareness of the robotic system comprises three-dimensional sensing and imaging using a simultaneous localization and mapping (SLAM) process.

12. The system of claim 11 wherein the SLAM process uses LIDAR sensors.

13. A method comprising:

performing a first scan of an environment using a plurality of sensors (types in dependent claims) associated with a robotic system, wherein the robotic system is placed within the environment and wherein the robotic system has spatial awareness with respect to the environment;

determining a scan frame of reference for each of the plurality of sensors using the spatial awareness of the robotic system within the environment and a relative position of each of the plurality of sensors with respect to the robotic system;

detecting, using at least one of the plurality of sensors, a feature associated with a location within the environment;

combining the feature in an ensemble predictor, wherein the ensemble predictor predicts an identification of the feature and the location of the feature within the environment;

generating a first map of the environment based on a result of combining the feature in the ensemble predictor;

performing a second scan of the environment and generate a second map of the environment;

comparing the first map of the environment to the second map of the environment; and identifying and locating differences in detected features between the first map and the second map, wherein the environment is a pipe and a liner is inserted into the pipe after the first scan and prior to the second scan, and wherein the detected feature is a lateral connection of the pipe and the differences predict where the lateral connection is located within the pipe after insertion of the liner.

14. The method of claim 13 wherein the ensemble predictor combines the detected features using a heuristic weighting algorithm that is applied as a function of location within the environment.

15. The method of claim 13 wherein the plurality of sensors comprises one or more of a first sensor type and one or more of a second sensor type and wherein the ensemble predictor is configured to combine sensor data from the first sensor type and the second sensor type.

16. The method of claim 15 wherein the ensemble predictor combines the detected features using a heuristic weighting algorithm that is applied as a function of sensor type.

17. The method of claim 15 wherein the robotic system captures sensor data from the plurality of sensors as it traverses the environment, wherein the sensor data comprises sensor data collected from different locations within the environment and wherein the ensemble predictor combines the detected features using a heuristic weighting algorithm that is applied as a function of location of the robotic system and the sensor type.

18. The method of claim 17, wherein the first sensor type and the second sensor type comprise an IR camera, a LIDAR camera, a visual camera, an inertial measurement unit (IMU), or a motor encoder.

* * * * *